US012695657B2

(12) United States Patent
Qu et al.

(10) Patent No.: US 12,695,657 B2
(45) Date of Patent: Jul. 28, 2026

(54) INFORMATION TRANSMISSION METHOD AND COMMUNICATION APPARATUS

(71) Applicant: HUAWEI TECHNOLOGIES CO., LTD., Shenzhen (CN)

(72) Inventors: Weilin Qu, Beijing (CN); Yiling Wu, Beijing (CN); Zhe Jin, Beijing (CN); Zhihu Luo, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 62 days.

(21) Appl. No.: 18/757,888

(22) Filed: Jun. 28, 2024

(65) Prior Publication Data

US 2024/0348486 A1 Oct. 17, 2024

Related U.S. Application Data

(63) Continuation of application No. PCT/CN2022/141706, filed on Dec. 24, 2022.

(30) Foreign Application Priority Data

Dec. 31, 2021 (CN) .......................... 202111678965.2

(51) Int. Cl.
*H04L 27/26* (2006.01)
*H04L 27/00* (2006.01)
*H04L 27/04* (2006.01)

(52) U.S. Cl.
CPC ...... *H04L 27/2697* (2013.01); *H04L 27/0008* (2013.01); *H04L 27/04* (2013.01)

(58) Field of Classification Search
CPC . H04L 27/2697; H04L 27/0008; H04L 27/04; H04L 5/0092; H04L 27/02;
(Continued)

(56) References Cited

U.S. PATENT DOCUMENTS 11,647,463 B2 * 5/2023 Azizi ................ H04W 52/0229
370/311
2018/0048513 A1 2/2018 Al-Imari et al.

FOREIGN PATENT DOCUMENTS

CN 108260209 A 7/2018
EP 3737062 A1 11/2020
(Continued)

OTHER PUBLICATIONS

IEEE:"30. Wake-Up Radio (WUR) PHY specification" IEEE P802. 11ba/D8.0, Dec. 2020. XP068183812, total 44 pages.
(Continued)

*Primary Examiner* — Vineeta S Panwalkar

(57) ABSTRACT

An information transmission method and a communication apparatus are disclosed. The method includes: A terminal device receives a first signal sent by a first network device based on a bandwidth of the first signal, where the first signal includes N first symbols, a modulation scheme of each of the N first symbols is ASK or OOK modulation, N is a positive integer, and the first signal is an orthogonal frequency division multiplexing (OFDM) signal; the terminal device determines a duration of the first symbol, where the duration of the first symbol is one of duration of at least one first symbol that is associated with the bandwidth of the first signal; and the terminal device determines, based on the duration of the first symbol, an information bit carried in the N first symbols.

20 Claims, 11 Drawing Sheets

(58) Field of Classification Search
CPC .............. H04L 27/2602; H04L 27/06; H04W
52/0229; H04W 52/02
See application file for complete search history.

(56) References Cited

FOREIGN PATENT DOCUMENTS

| | | | |
|----|--------------|----|--------|
| WO | 2020078530 | A1 | 4/2020 |
| WO | 2021004697 | A1 | 1/2021 |

OTHER PUBLICATIONS

D.-J. Deng et al., "IEEE 802.11ba: Low-Power Wake-Up Radio for Green IoT," in IEEE Communications Magazine, vol. 57, No. 7, pp. 106-112, Jul. 2019, doi: 10.1109/MCOM.2019.1800389.
International Search Report and Written Opinion issued in PCT/CN2022/141706, dated Feb. 13, 2023, 8 pages.
Vivo, Study on Low-power WUS, 3GPP TSG RAN Meeting #94-e, Electronic Meeting, Dec. 6-17, 2021, RP-213265, total 4 pages.
Jaeho Im et al., A 220-µW-83-dBm 5.8-GHz Third-Harmonic Passive Mixer-First LP-WUR for IEEE 802.11ba, Jul. 2019, total 9 pages.
Der-Jiunn Deng et al., IEEE 802.11ba Wake-Up Radio: Performance Evaluation and Practical Designs, Aug. 13, 2020, total 11 pages.

* cited by examiner

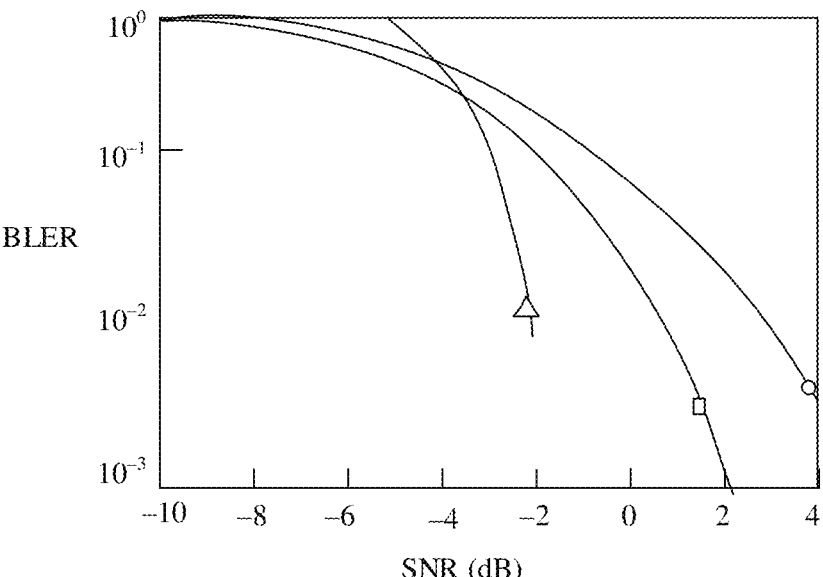

BLER

SNR (dB)

—○—    8.93 μs, where a coding multiple of a line code is 2
—□—    4.46 μs, where the coding multiple of the line code is 4
—△—    4.46 μs, where the coding multiple of the line code is
           2 and a channel coding code rate is 1/2

FIG. 9

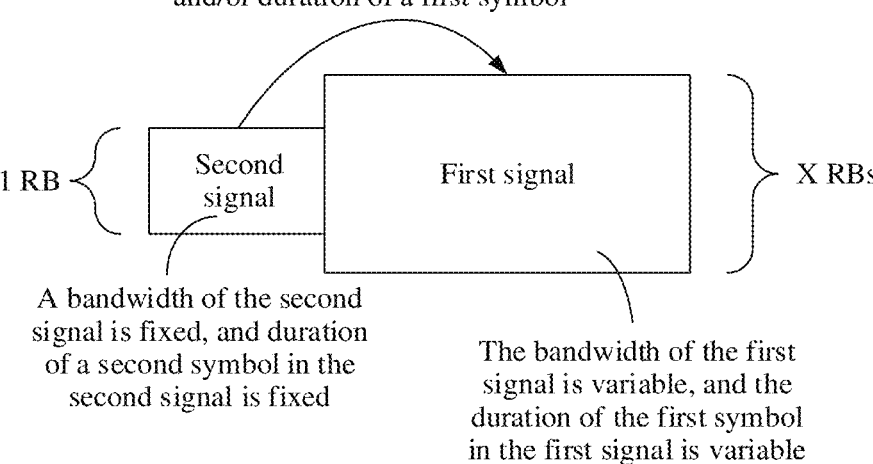

Indicating a bandwidth of the first signal
and/or duration of a first symbol

1 RB

Second signal

First signal

X RBs

A bandwidth of the second
signal is fixed, and duration
of a second symbol in the
second signal is fixed The bandwidth of the first
signal is variable, and the
duration of the first symbol
in the first signal is variable

FIG. 10

INFORMATION TRANSMISSION METHOD AND COMMUNICATION APPARATUS

CROSS-REFERENCE TO RELATED APPLICATIONS

This application is a continuation of International Application No. PCT/CN2022/141706, filed on Dec. 24, 2022, which claims priority to Chinese Patent Application No. 202111678965.2, filed on Dec. 31, 2021. The disclosures of the aforementioned applications are hereby incorporated by reference in their entireties.

TECHNICAL FIELD

The present disclosure relates to the field of communication technologies, and in particular, to an information transmission method and a communication apparatus.

BACKGROUND

The IEEE 802.11 standard organization started to discuss related content of wake-up radio (WUR) in 2017, and determined that the IEEE WUR standard is IEEE 802.11ba. In IEEE 802.11ba, it is proposed that a terminal device has two receivers: a main receiver and a secondary receiver. The main receiver is similar to an orthogonal frequency division multiplexing (OFDM) signal receiver of a conventional cellular terminal device, and no obvious change is made. The secondary receiver needs to be designed as a WUR receiver whose power consumption is less than 1 milliwatt (mW). A network device sends, to the secondary receiver, an amplitude shift keying (ASK)/on-off keying (OOK) modulation signal that presents an ON/OFF waveform in time domain. After receiving a signal, unlike a conventional cellular OFDM signal receiver, the secondary receiver does not perform coherent demodulation by using a signal generated by a high-frequency local oscillator, but performs incoherent demodulation by using an envelope detector based on an amplitude envelope of the signal. Because the secondary receiver does not need to generate a high-frequency local oscillator signal, power consumption of the secondary receiver is greatly reduced. The secondary receiver wakes up the main receiver only after the secondary receiver successfully demodulates data information by using the envelope detector. The receiver performs information transmission (for example, listens to a paging message) after being woken up.

It is proposed in standard discussion of the 3rd generation partnership project (3GPP) release-18 that in a new radio (NR) access system, an NR OFDM system can be used to generate an OOK/ASK signal to enable a receiver of a terminal device to perform envelope detection, so as to achieve an energy saving effect. However, after an OOK/ASK signal generation solution is introduced into the NR OFDM system, how to improve network frequency domain resource utilization when ensuring OOK/ASK signal transmission efficiency is an urgent problem to be resolved currently.

SUMMARY

The present disclosure provides an information transmission method and a communication apparatus, to help improve network frequency domain resource utilization when ensuring OOK/ASK signal transmission efficiency.

According to a first aspect, the present disclosure provides an information transmission method, and the method includes:

A terminal device receives, based on a bandwidth of a first signal, the first signal sent by a first network device, where the first signal includes N first symbols, a modulation scheme of the first symbol is amplitude shift keying (ASK) modulation or on-off keying (OOK) modulation, N is a positive integer, and the first signal is an orthogonal frequency division multiplexing (OFDM) signal; the terminal device determines a duration of the first symbol, where the duration of the first symbol is one of duration(s) of at least one first symbol that is associated with the bandwidth of the first signal; and the terminal device determines, based on the duration of the first symbol, an information bit carried in the N first symbols.

Based on the method described in the first aspect, there is an association relationship between the bandwidth of the first signal and the duration of the first symbol (the modulation scheme is ASK modulation or OOK modulation). Based on the association relationship, the first signal can be transmitted by using a small bandwidth when information transmission efficiency and information transmission performance are ensured, thereby improving network frequency domain resource utilization.

In a possible implementation, the duration(s) of the at least one first symbol that is associated with the bandwidth of the first signal is predefined; or the duration(s) of the at least one first symbol that is associated with the bandwidth of the first signal is configured by the first network device by using configuration information, and the configuration information is carried in radio resource control (RRC) signaling or media access control (MAC) signaling. Predefining the association relationship between the bandwidth of the first signal and the duration of the first symbol helps reduce network resource overheads. The first network device configures the association relationship between the bandwidth of the first signal and the duration of the first symbol. This helps flexibly update the association relationship between the bandwidth of the first signal and the duration of the first symbol.

In a possible implementation, the terminal device receives a second signal, where the second signal indicates the bandwidth of the first signal and/or one of the duration(s) of the at least one first symbol that is associated with the bandwidth of the first signal.

Based on this possible implementation, the network device can flexibly indicate, to the terminal device, the bandwidth of the first signal and/or one of the duration(s) of the at least one first symbol that is associated with the bandwidth of the first signal. In this way, there may be a plurality of adjustable types of information transmission rates, and information transmission is more flexible.

In a possible implementation, the second signal further indicates a first field, and the first field includes one or more of: a coding multiple of a line code of the first signal, a channel coding code rate of the first signal, or a quantity of bit repetitions of the first signal; and that the terminal device determines, based on the duration of the first symbol, an information bit carried in the N first symbols includes: The terminal device determines, based on the duration of the first symbol and the first field, the information bit carried in the N first symbols.

In this possible implementation, line code coding, repetition coding, and/or channel coding are/is introduced, so that information transmission performance can be further improved. In addition, based on this possible implementation, the network device may indicate the coding multiple of the line code of the first signal, the channel coding code rate of the first signal, or the quantity of the bit repetitions of the first signal. The coding multiple of the line code of the first signal, the channel coding code rate of the first signal, or the quantity of the bit repetitions of the first signal may be adjusted instead of being fixed. This can improve flexibility of information transmission.

In a possible implementation, the second signal is further used by the terminal device to perform time and frequency synchronization. That is, the second signal may be a synchronization signal. By using the synchronization signal, the bandwidth of the first signal and/or one of the duration(s) of the at least one first symbol that is associated with the bandwidth of the first signal can be more flexibly and dynamically adjusted, thereby improving flexibility of data signal transmission.

In a possible implementation, the second signal includes M same third signals in time domain, a value of M indicates the bandwidth of the first signal and/or one of the duration(s) of the at least one first symbol that is associated with the bandwidth of the first signal, and M is a positive integer. Based on this manner, the bandwidth of the first signal and/or one of the duration(s) of the at least one first symbol that is associated with the bandwidth of the first signal can be accurately indicated.

In a possible implementation, the second signal includes M same third signals, time domain masks on the M third signals indicate the bandwidth of the first signal and/or one of the duration(s) of the at least one first symbol that is associated with the bandwidth of the first signal, and M is a positive integer. Based on this manner, the bandwidth of the first signal and/or one of the duration(s) of the at least one first symbol that is associated with the bandwidth of the first signal can be accurately indicated. Through time domain mask indication information superimposed on a plurality of concatenated same synchronization signals, flexibility of dynamically adjusting data signal transmission can be improved as much as possible when ensuring time-frequency synchronization performance of the terminal device.

In a possible implementation, the second signal includes Q second symbols, a modulation scheme of the second symbol is ASK modulation or OOK modulation, Q is a positive integer, the second signal is an OFDM signal, and there is an association relationship between a bandwidth of the second signal and a duration of one second symbol. The terminal device may further determine, based on the duration of the second symbol that is associated with the bandwidth of the second signal, an information bit carried in the Q second symbols. Based on this possible implementation, there is also an association relationship between the bandwidth of the second signal and the duration of the second symbol, so that the second signal can be transmitted by using a small bandwidth when information transmission efficiency and information transmission performance are ensured, thereby improving network frequency domain resource utilization.

In a possible implementation, the bandwidth of the second signal and the duration of the second symbol that is associated with the bandwidth of the second signal are predefined.

In a possible implementation, the second signal is further used to carry RRC signaling or MAC signaling sent by the first network device. Transmission of a data signal is adjusted in a semi-static manner. For a terminal device with low mobility, signaling overheads can be reduced, and transmission of a data signal can be maintained for a period of time.

In a possible implementation, the terminal device sends the third signal to the first network device, where the third signal indicates one or more of: a signal coverage level of the terminal device, a measured reference signal received power (RSRP), a transmission rate requested by the terminal device, or information indicating whether the terminal device supports channel coding. Based on this possible implementation, the network device can select an optimal duration of the first symbol for the terminal device for transmission based on an actual coverage level, an actual channel decoding capability, and the like when a coverage requirement is met, thereby ensuring high information transmission efficiency.

According to a second aspect, the present disclosure provides an information transmission method, where the method includes:

A first network device sends a first signal to a terminal device, where the first signal includes N first symbols, a modulation scheme of the first symbol is amplitude shift keying (ASK) modulation or on-off keying (OOK) modulation, N is a positive integer, the first signal is an orthogonal frequency division multiplexing (OFDM) signal, and a duration of the first symbol is one of duration(s) of at least one first symbol that is associated with a bandwidth of the first signal.

In a possible implementation, the duration(s) of the at least one first symbol that is associated with the bandwidth of the first signal is predefined; or the duration(s) of the at least one first symbol that is associated with the bandwidth of the first signal is configured by the first network device by using configuration information, and the configuration information is carried in radio resource control (RRC) signaling or media access control (MAC) signaling.

In a possible implementation, the first network device sends a second signal to the terminal device, where the second signal indicates the bandwidth of the first signal and/or one of the duration(s) of the at least one first symbol that is associated with the bandwidth of the first signal.

In a possible implementation, the second signal further indicates a first field, and the first field includes one or more of: a coding multiple of a line code of the first signal, a channel coding code rate of the first signal, or a quantity of bit repetitions of the first signal.

In a possible implementation, the second signal is further used by the terminal device to perform time and frequency synchronization.

In a possible implementation, the second signal includes M same third signals in time domain, a value of M indicates the bandwidth of the first signal and/or one of the duration(s) of the at least one first symbol that is associated with the bandwidth of the first signal, and M is a positive integer.

In a possible implementation, the second signal includes M same third signals, time domain masks on the M third signals indicate the bandwidth of the first signal and/or one of the duration(s) of the at least one first symbol that is associated with the bandwidth of the first signal, and M is a positive integer.

In a possible implementation, the second signal includes Q second symbols, a modulation scheme of the second symbol is ASK modulation or OOK modulation, Q is a positive integer, the second signal is an OFDM signal, and there is an association relationship between a bandwidth of the second signal and a duration of one second symbol.

In a possible implementation, the bandwidth of the second signal and the duration of the second symbol that is associated with the bandwidth of the second signal are predefined.

In a possible implementation, the second signal carries RRC signaling or MAC signaling sent by the first network device.

In a possible implementation, before that the first network device sends a second signal to the terminal device, the method further includes:

The first network device receives a fourth signal sent by a second network device, where the fourth signal indicates the bandwidth of the first signal and/or one of the duration(s) of the at least one first symbol that is associated with the bandwidth of the first signal.

In a possible implementation, before that the first network device receives a fourth signal sent by a second network device, the method further includes:

The first network device receives the third signal sent by the terminal device, where the third signal indicates one or more of: a signal coverage level of the terminal device, a measured reference signal received power (RSRP), a transmission rate requested by the terminal device, or information indicating whether the terminal device supports channel coding; and the first network device sends the third signal to the second network device.

For beneficial effects of the second aspect, refer to beneficial effects of the first aspect.

According to a third aspect, the present disclosure provides a communication apparatus. The communication apparatus may be a terminal device, or may be an apparatus in a terminal device, or an apparatus that can be used in matching with a terminal device. The communication apparatus may alternatively be a chip system. The communication apparatus may perform the method according to the first aspect. Functions of the communication apparatus may be implemented by hardware, or may be implemented by hardware executing corresponding software.

The hardware or the software includes one or more units or modules corresponding to the foregoing functions. The unit or module may be software and/or hardware. For an operation performed by the communication apparatus and a beneficial effect, refer to the method and the beneficial effect in the first aspect.

According to a fourth aspect, the present disclosure provides a communication apparatus. The communication apparatus may be a first network device, an apparatus in the first network device, or an apparatus that can be used in matching with the first network device. The communication apparatus may alternatively be a chip system. The communication apparatus may perform the method according to the second aspect. Functions of the communication apparatus may be implemented by hardware, or may be implemented by hardware executing corresponding software. The hardware or the software includes one or more units or modules corresponding to the foregoing functions. The unit or module may be software and/or hardware. For an operation performed by the communication apparatus and a beneficial effect, refer to the method and the beneficial effect in the second aspect.

According to a fifth aspect, the present disclosure provides a communication apparatus. The communication apparatus includes a processor. When the processor invokes a computer program in a memory, the method in the first aspect or the second aspect is performed.

According to a sixth aspect, the present disclosure provides a communication apparatus. The communication apparatus includes a processor and a memory, the processor is coupled to the memory, and the processor is configured to implement the method according to the first aspect or the second aspect.

According to a seventh aspect, the present disclosure provides a communication apparatus. The communication apparatus includes a processor, a memory, and a transceiver, the processor is coupled to the memory, the transceiver is configured to send/receive data, and the processor is configured to implement the method according to the first aspect or the second aspect.

According to an eighth aspect, the present disclosure provides a communication apparatus. The communication apparatus includes a processor and an interface, the interface is configured to receive or output a signal, and the processor is configured to implement the method according to the first aspect or the second aspect by using a logic circuit or by executing code instructions.

According to a ninth aspect, the present disclosure provides a computer-readable storage medium. The storage medium stores a computer program or instructions. When the computer program or the instructions is/are executed by a communication apparatus, the method in any one of the first aspect to the sixth aspect is implemented.

According to a tenth aspect, the present disclosure provides a computer program product including instructions. When a computer reads and executes the computer program product, the computer is enabled to perform the method in any one of the first aspect to the sixth aspect.

BRIEF DESCRIPTION OF DRAWINGS

FIG. 9 is a example diagram of yet another transmission performance according to an embodiment of the present disclosure;

FIG. 10 is a diagram of an example signal bandwidth and symbol duration according to an embodiment of the present disclosure;

DESCRIPTION OF EMBODIMENTS

Figure 1:
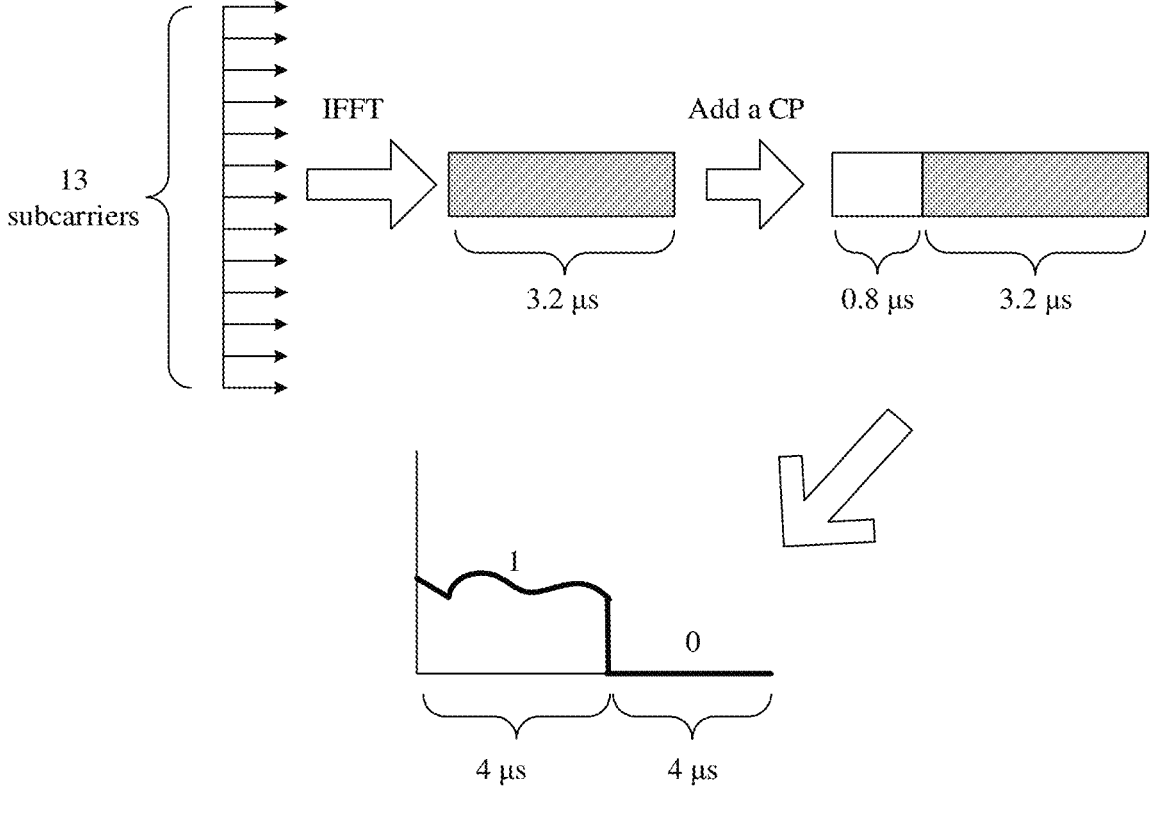
FIG. 1 is a diagram of an example ASK/OOK modulation symbol generation method according to an embodiment of the present disclosure.

The following further describes specific embodiments of the present disclosure in detail with reference to accompanying drawings.

The terms "first", "second", and the like in the specification, claims, and accompanying drawings of the present disclosure are used to distinguish between different objects, but are not used to describe a specific order. In addition, the terms "including" and "having" and any other variants thereof are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

An "embodiment" mentioned in the specification indicates that a particular feature, structure, or characteristic described with reference to this embodiment may be included in at least one embodiment of the present disclosure. The phrase shown in various locations in the specification may not necessarily refer to a same embodiment, and is not an independent or optional embodiment exclusive from another embodiment. It is explicitly and implicitly understood by a person skilled in the art that embodiments described in the specification may be combined with another embodiment.

In the present disclosure, "at least one (item)" means one or more, "a plurality of" means two or more, "at least two (items)" means two or three or more. The term "and/or" is used to describe an association relationship between associated objects and indicates that three relationships may exist. For example, "A and/or B" may indicate any one of the following three cases: Only A exists, only B exists, and both A and B exist, where A and B may be singular or plural. The character "/" generally indicates an "or" relationship between the associated objects. "At least one of the following items (pieces)" or a similar expression thereof refers to any combination of these items, including any combination of singular items (pieces) or plural items (pieces). For example, at least one of a, b, or c may indicate a, b, c, a and b, a and c, b and c, or a, b, and c, where a, b, and c may be singular or plural.

To better understand embodiments of the present disclosure, the following first describes related technical features in embodiments of the present disclosure. It should be noted that these explanations are intended to make embodiments of the present disclosure easier to understand, but should not be considered as a limitation on the protection scope claimed in the present disclosure.

1. Wake-Up Radio (WUR)

In a period of a 4th generation (4G) mobile communication technology, the 3rd generation partnership project (3GPP) introduces a narrow-band internet of things (narrow-band IoT, NB-IoT) system. In the system, a terminal device may be allowed to transmit data by using a single subcarrier. In addition, in the NB-IoT system, a wake-up signal (WUS) is supported. To be specific, the terminal device wakes up only after receiving a wake-up signal from a network device, to receive data information from the network device. In this manner, the terminal device may be in a sleep state for a longer time, and does not need to frequently wake up and listen to a message, for example, a paging message. This further reduces power consumption of the terminal device, and achieves a further energy saving effect on the terminal device. However, even if the foregoing technology enables a NB-IoT device to reduce power consumption, because a receiver of the NB-IoT terminal device is an OFDM signal receiver, and power consumption of the OFDM signal receiver is high, power consumption reduction of the NB-IoT device reaches a bottleneck and the power consumption cannot be further reduced.

Therefore, the IEEE 802.11 standard organization started to discuss WUR-related content in 2017, and determined that an IEEE WUR standard is IEEE 802.11ba. In IEEE 802.11ba, it is proposed that a terminal device has two receivers: a main receiver and a secondary receiver. The main receiver is similar to an OFDM signal receiver of a conventional cellular terminal device, and no obvious change is made. The secondary receiver needs to be designed as a WUR receiver whose power consumption is less than 1 milliwatt (mW). The network device sends, to the secondary receiver, an ASK/OOK modulation symbol that presents an ON/OFF waveform in time domain. After receiving a signal, unlike a conventional cellular OFDM signal receiver, the secondary receiver does not perform coherent demodulation by using a signal generated by a high-frequency local oscillator, but performs incoherent demodulation by using an envelope detector based on an amplitude envelope of the signal. Because the secondary receiver does not need to generate a high-frequency local oscillator signal, power consumption of the secondary receiver is greatly reduced. The secondary receiver wakes up the main receiver only after the secondary receiver successfully demodulates data information by using the envelope detector. The receiver performs information transmission (for example, listens to a paging message) after waking up.

In the IEEE 802.11ba protocol, the terminal device can work at a 2.4 GHz or 5 GHz frequency. In addition, the IEEE 802.11ba supports subcarrier spacing of 312.5 kHz and OFDM symbol duration of a 4 μs (microsecond) symbol (high data rate, HDR) and a 2 μs symbol (low data rate, LDR). For example, an OFDM symbol duration is 4 μs. As shown in FIG. 1, in the IEEE 802.11ba, a WUR signal occupies 13 central subcarriers of 20 MHz in a system, and occupies a bandwidth of approximate 4.06 MHz. A sequence including 12 elements is mapped to 12 subcarriers of the 13 subcarriers except a central subcarrier (a subcarrier #0). Elements of the sequence may be selected from binary phase shift keying (BPSK)/quadrature phase shift keying (QPSK)/ 16 quadrature amplitude modulation (16QAM/64QAM/ 256QAM modulation constellation points. After the 13 subcarriers map all the elements in the sequence, inverse fast Fourier transformation (IFFT) and CP addition operations of the OFDM transmitter are performed to generate an OFDM symbol. The terminal device considers that the OFDM symbol carries one ON symbol, that is, the secondary receiver determines, by using the envelope detector, a bit "1"

sent on the ON symbol. If no information is sent on the 13 central subcarriers, that is, "0" is sent on the 13 subcarriers, after the IFFT and CP addition operations of the OFDM transmitter, the generated OFDM symbol is also an energy-free "0" signal. The terminal device considers that the OFDM symbol carries an OFF symbol, that is, the secondary receiver determines, by using the envelope detector, a bit "0" sent on the OFF symbol. It can be learned that in the IEEE 802.11ba protocol, one OFDM symbol carries one ASK/OOK modulation symbol. The IEEE 802.11ba supports manchester line coding. For the 4 μs symbol, information bit 0 is encoded as 1010, and information bit 1 is encoded as 0101. Therefore, four ON/OFF symbols are required to transmit one piece of information, and an information transmission rate is 1 bit/(4*4 μs)=62.5 kbps.

2. Passive IoT

Figure 2:
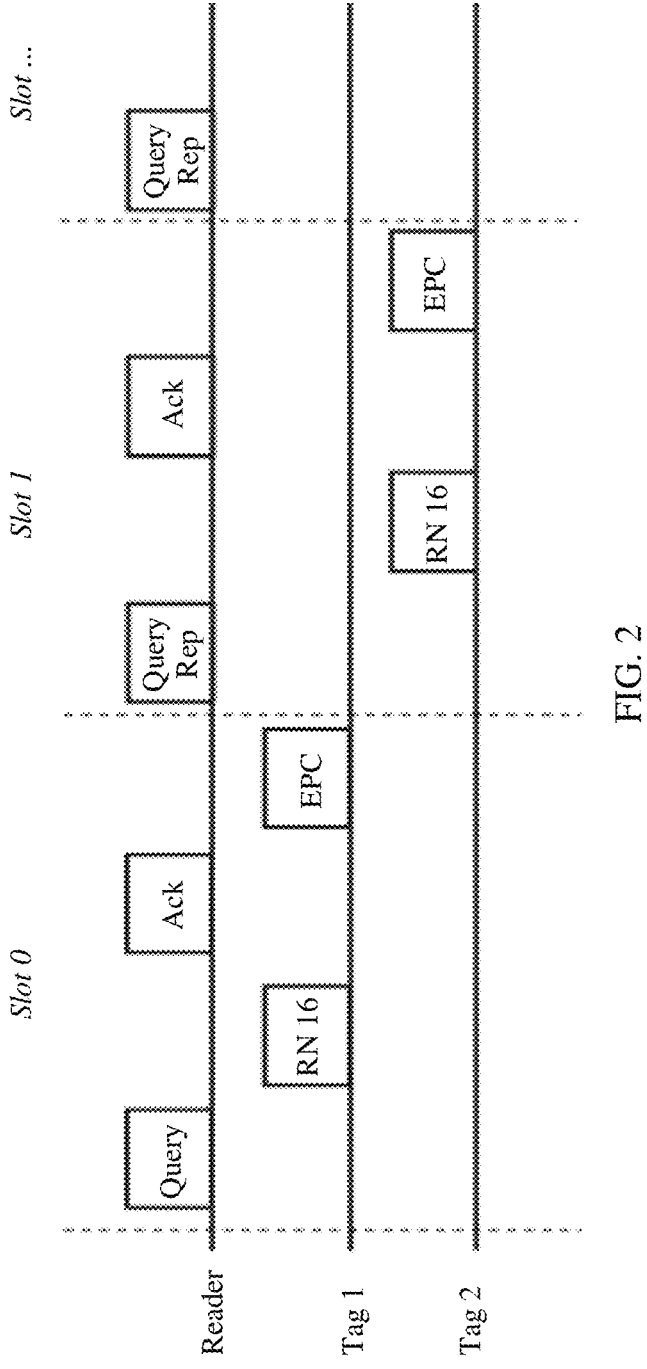
FIG. 2 is an example diagram of interaction between a reader and a tag according to an embodiment of the present disclosure.

The passive IoT is an important research direction in the 5G/5.5G IoT field. In a passive IoT system, a reader sends waveforms continuously including a high level to a passive tag. After receiving the energy, the tag reflects information to the reader through a reverse link. According to a radio frequency identification (RFID) air interface protocol ISO 18000-6C, tag reflection uses a dynamic slotted ALOHA technology. As shown in FIG. 2, a specific communication process between the reader and the tag is as follows.

(1) Tag selection process. The reader first sends select signaling, and uses the signaling to select a tag/tag group to be stored and accessed.

(2) Tag inventory process. The reader sends query signaling to a selected to-be-stored tag, where the query signaling includes a parameter Q. After receiving the query signaling, the to-be-stored tag selects a random number from a range of $(0, 2^Q-1)$ and loads the random number into a slot counter of the tag. The tag selecting a non-zero value is transferred to an arbitration state, and the tag selecting a zero value enters a response state and responds with an RN 16. The reader then replies with an ACK command acknowledgment tag including the same RN 16. A confirmed tag is transferred to a confirmed state and replies with identification information of the tag, for example, electronic product code (EPC), to complete a basic information inventory process of the tag. After correctly receiving the identification information, a network device ends this slot, enters a next slot, and starts to send query repeat (queryrep) signaling or query adjust signaling. In FIG. 2, an example in which a network device sends queryrep signaling is used. When the tag in the confirmed state receives the queryrep signaling or the queryadjust signaling, an inventory flag of the tag is reversed, the tag is transferred to a ready state, and this round inventory process ends.

The queryrep signaling operation, without changing any parameter, is the same as the previous query signaling operation. Each time the queryrep signaling is received, a value in the slot counter of the tag in the arbitration state is decreased by 1. In this case, a tag whose value is decreased to 0 in the slot counter repeats a same response process as described above. The previous query operation is repeated for the queryadjust signaling and Q can be increased or decreased. In addition, if the tag in the arbitration state receives queryadjust signaling, the tag adjusts the Q value, selects a random number within the range of $(0, 2^Q-1)$, and loads the random number to the slot counter of the tag. In this case, the tag selecting a non-zero value is transferred to the arbitration state, and the tag selecting a 0 value enters the response state.

Similar to a secondary receiver of a WUR, a tag receiver in the passive IoT uses an envelope detector receiver to demodulate an ASK/OOK modulation symbol incoherently. Therefore, the foregoing signaling is sent by using an ASK/OOK modulation symbol, the tag detects the corresponding ASK/OOK modulation symbol, and then demodulates a meaning of each field parameter in the signaling to determine a meaning of the signaling.

It is proposed in a standard discussion of 3GPP Release-18 that a WUR-related technology and a passive IoT-related technology are supported in an NR system. If a method for generating an ASK/OOK modulation symbol in the IEEE 802.11ba standard is directly introduced into an NR WUR or an NR passive IoT, because an NR supports only subcarrier spacing 15 kHz/30 kHz/60 kHz in an FRI frequency band, a duration of one ASK/OOK modulation symbol changes from 4 μs to 66.7 μs. If one ASK/OOK modulation symbol is still carried on one OFDM symbol in the IEEE 802.11ba protocol, an information transmission rate is far lower than an information transmission rate of the WUR in the IEEE 802.11ba protocol. For example, when the subcarrier spacing is 15 kHz, an information transmission rate of the NR WUR or the NR passive IoT is 312.5/15≈20 times lower than that of the WUR in the IEEE 802.11ba protocol. As a result, the information transmission efficiency of the NR WUR or the NR passive IoT is excessively low. A plurality of ASK/OOK modulation symbols can be carried on a time-domain OFDM symbol through a time-domain or frequency-domain design. This effectively improves information transmission efficiency. However, if a plurality of ASK/OOK modulation symbols are carried on one time-domain OFDM signal, information transmission performance may be low if a transmission bandwidth is small. If the transmission bandwidth is very large, network frequency domain resource utilization is low.

To improve network frequency domain resource utilization, the present disclosure provides an information transmission method and a communication apparatus. The following first describes a system architecture in embodiments of the present disclosure.

Figure 3:
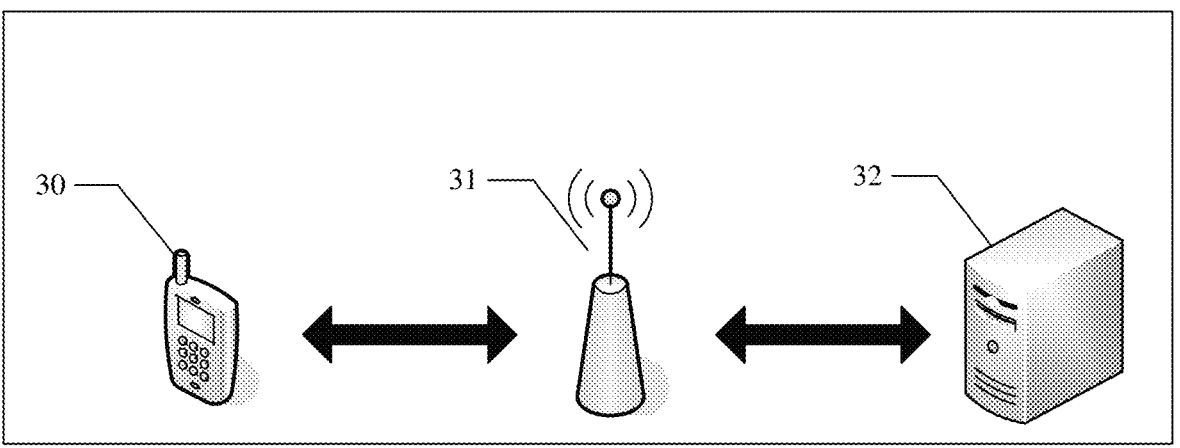
FIG. 3 is a diagram of an example communication system according to an embodiment of the present disclosure.

FIG. 3 is a diagram of a communication system according to an embodiment of the present disclosure. As shown in FIG. 3, the communication system includes a terminal device 30 and an access network device 31. Optionally, the communication system further includes a core network device 32. A quantity of terminal devices is merely an example, and the quantity of terminal devices is not specifically limited in this embodiment.

The following separately describes in detail the terminal device and the network device in FIG. 1.

1. Terminal Device

The terminal device is a device having a wireless transceiver function on a user side, and may be deployed on land, where the deployment includes indoor or outdoor, handheld, wearable, or vehicle-mounted deployment, may be deployed on water (for example, on a ship), or may be deployed in air (for example, on an airplane, a balloon, and a satellite).

The terminal device has a receiver having an ASK/OOK modulation symbol receiving function or an envelope detection function. Alternatively, the terminal device has a main receiver and a secondary receiver. The main receiver is similar to an OFDM signal receiver of a conventional cellular terminal device, and no obvious change is made. The secondary receiver is a receiver having an ASK/OOK modulation symbol receiving function or an envelope detection function.

For example, the terminal device may be specifically a mobile phone, a tablet (Pad), a computer with a wireless transceiver function, a virtual reality (VR) terminal device, an augmented reality (AR) terminal device, a wireless terminal in industrial control (industrial control), a vehicle-mounted terminal device, a wireless terminal in self driving, a wireless terminal in remote medical (remote medical), a wireless terminal in a smart grid, a wireless terminal in transportation safety (transportation safety), a wireless terminal in a smart city, a wireless terminal and a tag in smart home, such as a passive tag, a semi-passive tag, an energy storage tag, an active tag, an industrial network sensor, a video surveillance camera, a wearable device (smart watch), a water meter, and an electricity meter. An application scenario is not limited in embodiments of the present disclosure. A terminal may also be referred to as a terminal device, user equipment (UE), an access terminal device, a vehicle-mounted terminal, an industrial control terminal, a UE unit, a UE station, a mobile station, a remote station, a remote terminal device, a mobile device, a UE terminal device, a terminal device, or a wireless communication device, a UE agent, a UE apparatus, or the like. The terminal may alternatively be fixed or movable.

2. Access Network Device

The access network device is an entity configured to transmit or receive a signal on a network side. The access network device includes, for example, but is not limited to, a new generation NodeB (gNB), an evolved NodeB (eNB), a next generation evolved NodeB (next generation eNB, ng-eNB), a wireless backhaul device, a radio network controller (RNC), a NodeB (NB), a base station controller (BSC), a base transceiver station (BTS), a home NodeB ((home evolved NodeB, HeNB) or (home NodeB, HNB)), a baseband unit (BBU), a transmission reception point (TRP), a transmission point (TP), a mobile switching center, and an entity that transmits a signal to a tag terminal device, for example, a reader, in a 5G communication system.

3. Core Network Device

A core network (CN) may include one or more CN devices. The 5G communication system is used as an example. The CN may include an access and mobility management function (AMF) network element, a session management function (SMF) network element, a user plane function (UPF) network element, a policy control function (PCF) network element, a unified data management (UDM) network element, an application function (AF) network element, and the like.

In addition, the CN may further include another possible network element, for example, a network exposure function (NEF) network element, a unified data repository (UDR) network element, or a network data analysis function (NWDAF) network element.

In the present disclosure, the access network device and the core network device are collectively referred to as a network device. In the following, the access network device is referred to as a first network device, and the core network device is referred to as a second network device.

It may be understood that the 5G communication system is used as an example for illustration in FIG. 3. The solutions in embodiments of the present disclosure may be further applied to another possible communication system, for example, an LTE communication system or a future 6th generation (6G) communication system. The foregoing network element of functions may be network elements in a hardware device, may be software functions run on dedicated hardware, or may be instantiated virtualization functions on a platform (for example, a cloud platform). Optionally, the network element or function may be implemented by one device, or may be jointly implemented by a plurality of devices, or may be a functional module in one device. This is not specifically limited in embodiments of the present disclosure.

The following further describes in detail an information transmission method and a communication apparatus that are provided in embodiments of the present disclosure.

Figure 4:
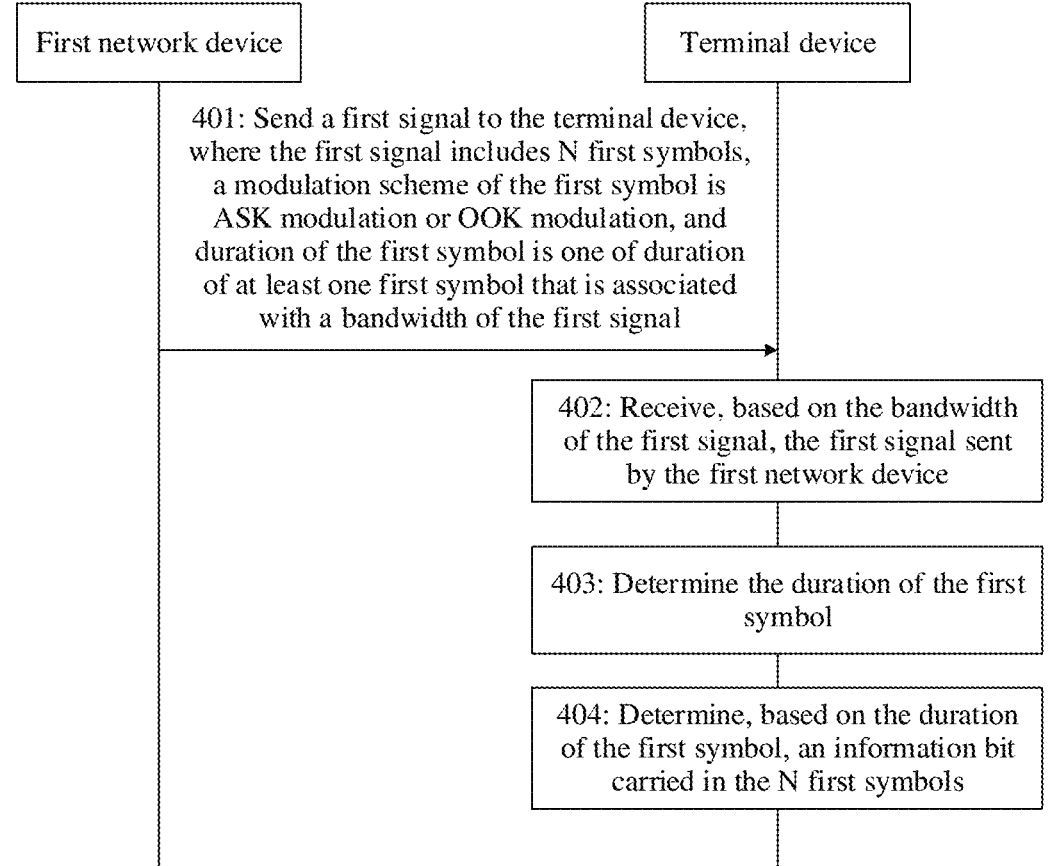
FIG. 4 is a diagram of an example information transmission method according to an embodiment of the present disclosure.

FIG. 4 is a schematic flowchart of an information transmission method according to an embodiment of the present disclosure. As shown in FIG. 4, the information transmission method includes the following steps 401 to 404. The method shown in FIG. 4 may be performed by a terminal device and a first network device (an access network device), or may be performed by a chip in a terminal device and a chip in a first network device. In FIG. 4, an example in which the method is performed by the terminal device and the first network device is used for description. In addition, processing performed by a single execution body shown in FIG. 4 may alternatively be performed by a plurality of execution bodies through division, and these execution bodies are logically and/or physically separated. For example, processing performed by an access network device may be performed by at least one of a central unit (CU), a distributed unit (DU), and a radio unit (RU) through division.

401: The first network device sends the first signal to a terminal device.

The first signal includes N first symbols, a modulation scheme of the first symbol is ASK modulation or OOK modulation, N is a positive integer, the first signal is an OFDM signal, and a duration of the first symbol is one of duration(s) of at least one first symbol that is associated with bandwidth of the first signal.

In this embodiment, there is an association relationship between the bandwidth of the first signal and the duration of the first symbol. One bandwidth of the first signal may be associated with at least one piece of duration of the first symbol. The first signal is an OFDM signal corresponding to one OFDM symbol. Alternatively, the duration of the first symbol may be a symbol duration of the first symbol, a symbol rate of the first symbol, and a relationship between a duration of the first symbol and a duration of the first signal. The first signal includes or carries a quantity relationship of first symbols, for example, a ratio of the duration of the first symbol to the duration of the first signal. For example, the first signal is an OFDM signal with subcarrier spacing of 15 kHz, and corresponds to one OFDM symbol. The first signal includes eight first symbols. The duration of the first symbol is $\frac{1}{8}$ of the duration of the first signal. The first signal is a signal corresponding to one OFDM symbol to which no cyclic prefix (CP) is added and whose subcarrier spacing is 15 kHz, and duration is 66.7 μs. The duration of the first symbol or the symbol duration of the first symbol is 66.7 μs/8=8.33 μs, and the symbol rate of the first symbol is 120 kbps.

Optionally, one piece of duration of the first symbol is associated with one bandwidth of the first signal. Optionally, if a first bandwidth of the first signal is greater than a second bandwidth of the first signal, a duration of the first symbol that is associated with the first bandwidth is greater than a duration of the first symbol that is associated with the second bandwidth. For example, as shown in the following Table 1, the duration of the first symbol is 66.7 μs, 33.3 μs, 16.67 μs, or 8.33 μs. That is, the first signal includes 1, 2, 4, or 8 first symbols, or the ratio of the duration of the first symbol to the duration of the first signal is 1, $\frac{1}{2}$, $\frac{1}{4}$, or $\frac{1}{8}$. The duration 66.7 μs, 33.3 μs, 16.67 μs, or 8.33 μs of the first symbol is associated with a bandwidth 1 RB of the first signal. The duration of the first symbol is 5.55 μs, 4.16 μs, or 3.33 μs. That is, the first signal includes 12, 16, or 20 first symbols, or the ratio of the duration of the first symbol to the duration of the first signal is $\frac{1}{12}$, $\frac{1}{16}$, or $\frac{1}{20}$. The duration 5.55 μs, 4.16 μs, or 3.33 μs of the first symbol is associated with a bandwidth 2 RBs of the first signal. In other words, if the bandwidth of the first signal is 1 RB, the duration of the first symbol is one of 66.7 μs, 33.35 μs, 16.67 μs, and 8.33 μs. If the bandwidth of the first signal is 2 RBs, the duration of the first symbol is one of 5.55 μs, 4.16 μs, and 3.33 μs.

Figure 5:
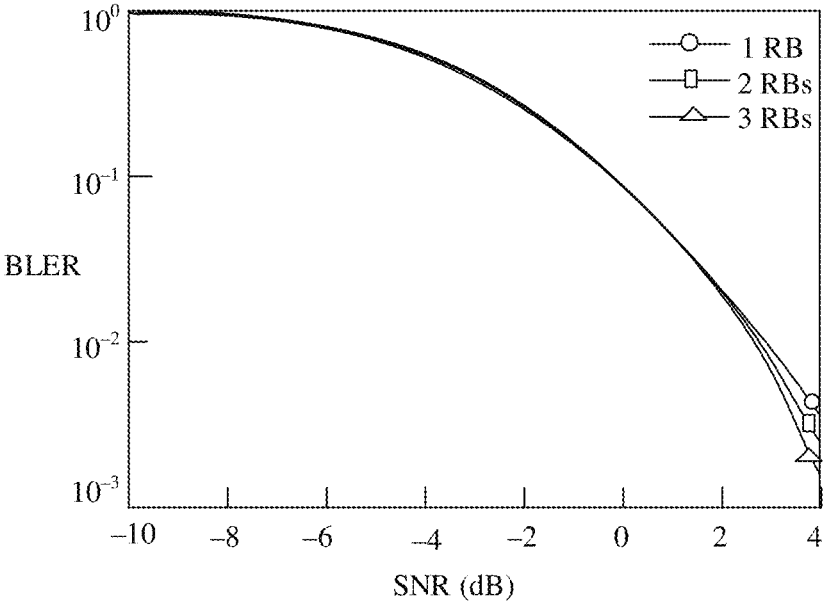
FIG. 5 is an example diagram of transmission performance according to an embodiment of the present disclosure.

As shown in FIG. 5, when the duration of the first symbol is 8.33 μs, and the bandwidth of the first signal is 1 RB, 2 RBs, or 3 RBs, and a target BLER (block error rate, block error rate) is $10^{-2}$, signal-to-noise ratios (SNR) corresponding to the three bandwidths are basically close. Therefore, when the duration of the first symbol is 8.33 μs, a transmission requirement can be met if the bandwidth of the first signal is greater than or equal to 1 RB.

Figure 6:
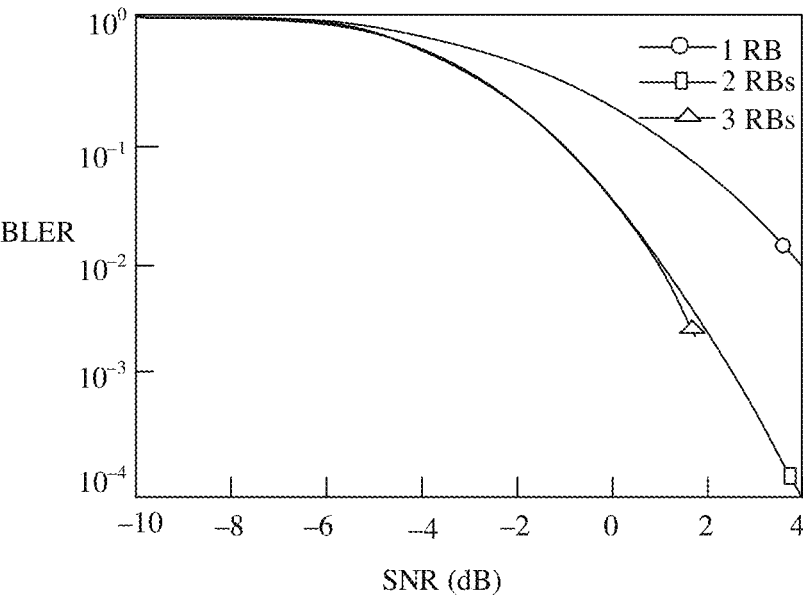
FIG. 6 is an example diagram of another type of transmission performance according to an embodiment of the present disclosure.

As shown in FIG. 6, when the duration of the first symbol is 5.55 μs, the bandwidth of the first signal is 1 RB, 2 RBs, or 3 RBs, and the target BLER is $10^{-2}$, it is clear that an SNR value corresponding to the bandwidth 1 RB is greater than each of SNR values corresponding to 2 RBs and 3 RBs. A smaller SNR indicates a longer distance between the terminal device and the first network device. Therefore, it is clear that transmission performance when the bandwidth of the first signal is 2 RBs or 3 RBs is better than transmission performance when the bandwidth of the first signal is 1 RB. On the premise of ensuring performance, the requirement can be met only when the bandwidth of the first signal is greater than or equal to 2 RBs.

Figure 7:
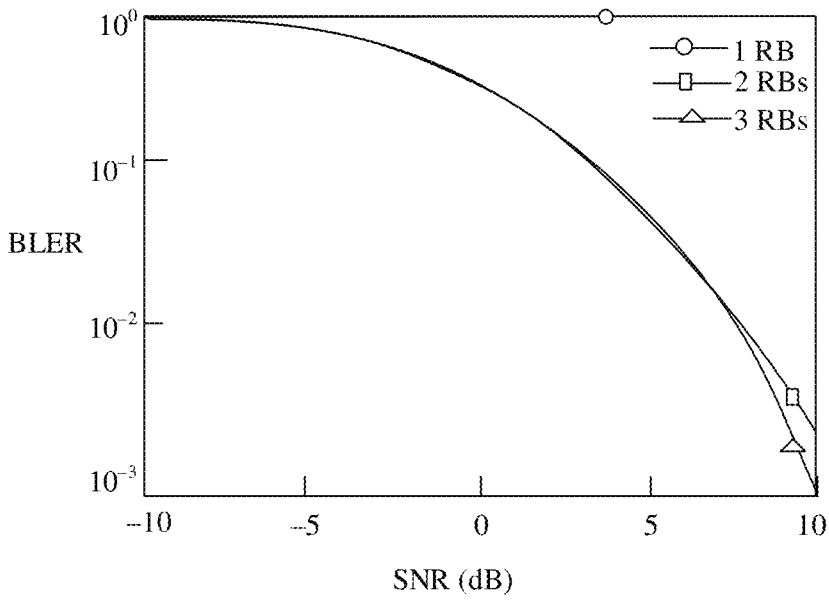
FIG. 7 is an example diagram of still another transmission performance according to an embodiment of the present disclosure.

Similarly, as shown in FIG. 7, when the duration of the first symbol is 4.16 μs, the bandwidth of the first signal is 1 RB, 2 RBs, or 3 RBs, and the target BLER is $10^{-2}$, it is clear that transmission performance when the bandwidth of the first signal is 2 RBs or 3 RBs is better than transmission performance when the bandwidth of the first signal is 1 RB. Even when the bandwidth of the first signal is 1 RB, effective transmission of the first signal cannot be supported. Therefore, when the duration of the first symbol is 4.16 μs, the requirement can be met only when the bandwidth of the first signal is greater than or equal to 2 RBs.

When the duration of the first symbol is 8.33 μs, even if the bandwidth of the first signal is set to be greater than 1 RB, transmission performance of the first signal cannot be improved. Therefore, to optimize network resource overheads, the duration 8.33 μs of the first symbol is associated with the bandwidth 1 RB of the first signal, and there is no need to associate the duration 8.33 μs of the first symbol with a larger bandwidth. Similarly, when the duration of the first symbol is 5.55 μs, even if the bandwidth of the first signal is set to be greater than 2 RBs, transmission performance of the first signal cannot be improved. Therefore, to optimize network resource overheads, the duration 5.55 μs of the first symbol may be associated with the bandwidth 2 RBs of the first signal, and there is no need to associate the duration 5.55 μs with a larger bandwidth. Association relationships between duration(s) of other first symbols and the bandwidth of the first signal in Table 1 are similar.

TABLE 1

| Duration (μs) of one first symbol | Bandwidth (RB) of the first signal |
| --- | --- |
| 66.7 | 1 |
| 33.35 | 1 |

TABLE 1-continued

| Duration (μs) of one first symbol | Bandwidth (RB) of the first signal |
| --- | --- |
| 16.67 | 1 |
| 8.33 | 1 |
| 5.55 | 2 |
| 4.16 | 2 |
| 3.33 | 2 |
| . . . | . . . |

In another possible implementation, one piece of duration of the first symbol may alternatively be associated with a plurality of bandwidths of the first signal. For example, as shown in the following Table 2, the duration 66.7 μs of the first symbol is associated with the bandwidth of the first signal that is greater than or equal to 1 RB. The duration 33.35 μs of the first symbol is associated with the bandwidth of the first signal that is greater than or equal to 1 RB. The duration 16.67 μs of the first symbol is associated with the bandwidth of the first signal that is greater than or equal to 1 RB. The duration 8.33 μs of the first symbol is associated with the bandwidth of the first signal that is greater than or equal to 1 RB. The duration 5.55 μs of the first symbol is associated with the bandwidth of the first signal that is greater than or equal to 2 RBs. The duration 4.16 μs of the first symbol is associated with the bandwidth of the first signal that is greater than or equal to 2 RBs. The duration 3.33 μs of the first symbol is associated with the bandwidth of the first signal that is greater than or equal to 2 RBs. If the bandwidth of the first signal is 1 RB, the duration of the first symbol is one of 66.7 μs, 33.35 μs, 16.67 μs, and 8.33 μs. If the bandwidth of the first signal is 2 RBs, the duration of the first symbol is one of 66.7 μs, 33.35 μs, 16.67 μs, 8.33 μs, 5.55 μs, 4.16 μs, and 3.33 μs.

TABLE 2

| Duration (μs) of one first symbol | Bandwidth (RB) of the first signal |
| --- | --- |
| 66.7 | ≥1 |
| 33.35 | ≥1 |
| 16.67 | ≥1 |
| 8.33 | ≥1 |
| 5.55 | ≥2 |
| 4.16 | ≥2 |
| 3.33 | ≥2 |
| . . . | . . . |

The following Table 3 and Table 4 are examples of an association relationship between the bandwidth of the first signal and the ratio of the duration of the first symbol to the duration of the first signal.

TABLE 3

| Ratio of the duration of the first symbol to the duration of the first signal (the duration of one first symbol may be determined) | Bandwidth (RB) of the first signal |
| --- | --- |
| 1 | 1 |
| 1/2 | 1 |
| 1/4 | 1 |
| 1/8 | 1 |
| 1/12 | 2 |
| 1/16 | 2 |
| 1/20 | 2 |
| . . . | . . . |

15

TABLE 4

| Ratio of the duration of the first symbol to the duration of the first signal (the duration of one first symbol may be determined) | Bandwidth (RB) of the first signal |
|---|---|
| 1 | ≥1 |
| 1/2 | ≥1 |
| 1/4 | ≥1 |
| 1/8 | ≥1 |
| 1/12 | ≥2 |
| 1/16 | ≥2 |
| 1/20 | ≥2 |
| . . . | . . . |

In a possible implementation, the duration(s) of the at least one first symbol that is associated with the bandwidth of the first signal is predefined; or the duration(s) of the at least one first symbol that is associated with the bandwidth of the first signal is configured by the first network device by using configuration information, and the configuration information is carried in radio resource control (RRC) signaling or medium access control (MAC) signaling. In other words, the association relationship between the bandwidth of the first signal and the duration of the first symbol may be predefined, or may be configured by the first network device by using the configuration information. Predefining the association relationship between the bandwidth of the first signal and the duration of the first symbol helps reduce network resource overheads. The first network device configures the association relationship between the bandwidth of the first signal and the duration of the first symbol. This helps flexibly update the association relationship between the bandwidth of the first signal and the duration of the first symbol.

Optionally, the RRC signaling may be RRC release signaling, RRC reestablishment signaling, RRC resume signaling, or the like. Alternatively, the RRC signaling may be one of select signaling, query signaling, query repeat (queryrep) signaling, or query adjust (queryadjust) signaling in a passive IoT.

402: The terminal device receives, based on the bandwidth of the first signal, the first signal sent by the first network device.

In this embodiment, before receiving, based on the bandwidth of the first signal, the first signal sent by the first network device, the terminal device further needs to determine the bandwidth of the first signal. After determining the bandwidth of the first signal, the terminal device receives, based on the bandwidth of the first signal, the first signal sent by the first network device.

403: The terminal device determines the duration of the first symbol.

The duration of the first symbol that is determined by the terminal device is one of the duration of at least one first symbol that is associated with the bandwidth of the first signal. For example, it is assumed that an association relationship between the bandwidth of the first signal and the duration of the first symbol is shown in the foregoing Table 1. If the bandwidth of the first signal is 1 RB, the duration of the first symbol that is determined by the terminal device is one of 66.7 μs, 33.35 μs, 16.67 μs, and 8.33 μs. If the bandwidth of the first signal is 2 RBs, the duration of the first symbol that is determined by the terminal device is one of 5.55 μs, 4.16 μs, and 3.33 μs.

In this embodiment, the terminal device may first determine the bandwidth of the first signal, and then determine the duration of the first symbol. Alternatively, the terminal device may determine the duration of the first symbol and the bandwidth of the first signal at the same time.

In a possible implementation, the first network device may send a second signal to the terminal device, where the second signal indicates the bandwidth of the first signal and/or one of the duration(s) of the at least one first symbol that is associated with the bandwidth of the first signal. After receiving the second signal, the terminal device determines, based on the second signal, the bandwidth of the first signal and/or one of the duration(s) of the at least one first symbol that is associated with the bandwidth of the first signal. For a specific description of the possible implementation, refer to the descriptions in embodiment corresponding to FIG. 8.

In another possible implementation, the first network device may alternatively not send the second signal to the terminal device. The terminal device may determine, based on a preset rule, one of the bandwidth of the first signal and the duration(s) of the at least one first symbol that is associated with the bandwidth of the first signal.

404: The terminal device determines, based on the duration of the first symbol, an information bit carried in the N first symbols.

In this embodiment, after determining the duration of the first symbol, the terminal device determines, based on the duration of the first symbol, the information bit carried in the N first symbols. For example, if the duration of the first symbol that is determined by the terminal device is 5.55 μs, the terminal device determines, based on the duration 5.55 μs of the first symbol, the information bit carried in the N first symbols. Optionally, the terminal device may obtain signal energy or average signal energy in the duration of the first symbol based on the duration of the first symbol, and compare the signal energy or the average signal energy with a demodulation or detection threshold set by the terminal device. If the signal energy or the average signal energy is greater than the demodulation or detection threshold, the terminal device determines that the information bit carried in the first symbol is 1. If the signal energy or the average signal energy is less than the demodulation or detection threshold, the terminal device determines that the information bit carried in the first symbol is 0.

It can be learned that in the method described in FIG. 4, there is an association relationship between the bandwidth of the first signal and the duration of the first symbol (the modulation scheme is ASK modulation or OOK modulation). Based on the association relationship, the first signal can be transmitted by using a small bandwidth when information transmission efficiency and information transmission performance are ensured, thereby improving network frequency domain resource utilization.

Figure 8:
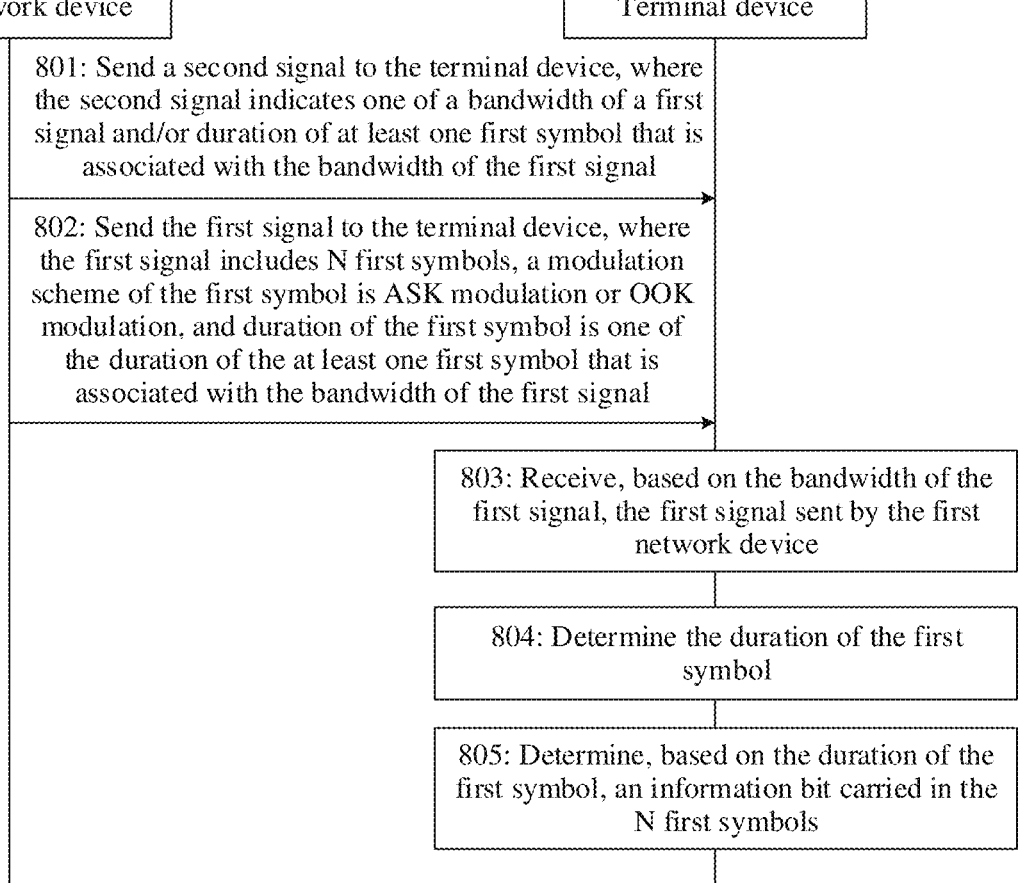
FIG. 8 is an example diagram of another information transmission method according to an embodiment of the present disclosure.

FIG. 8 is a schematic flowchart of an information transmission method according to an embodiment of the present disclosure. As shown in FIG. 8, the information transmission method includes the following steps 801 to 805. The method shown in FIG. 8 may be performed by a terminal device and a first network device (an access network device), or may be performed by a chip in a terminal device and a chip in a first network device. In FIG. 8, an example in which the method is performed by the terminal device and the first network device is used for description. In addition, processing performed by a single execution body shown in FIG. 8 may alternatively be performed by a plurality of execution bodies through division, and these execution bodies are logically and/or physically separated. For example, processing performed by an access network device may be performed by at least one of a central unit (CU), a distributed unit (DU), and a radio unit (RU) through division.

801: The first network device sends a second signal to the terminal device, where the second signal indicates a bandwidth of a first signal and/or one of duration(s) of at least one first symbol that is associated with the bandwidth of the first signal. Correspondingly, the terminal device may receive the second signal.

In this embodiment, the first network device may send the second signal to the terminal device before sending a first signal to the terminal device, to notify the terminal device of the bandwidth of the subsequently sent first signal and/or one of the duration(s) of the at least one first symbol that is associated with the bandwidth of the first signal.

Optionally, if the second signal indicates the bandwidth of the first signal, the terminal device determines the bandwidth of the first signal based on the second signal after receiving the second signal, and then determines, based on the bandwidth of the first signal, one of the duration(s) of the at least one first symbol that is associated with the bandwidth of the first signal.

For example, it is assumed that an association relationship between the bandwidth of the first signal and the duration of the first symbol is shown in Table 5. If the second signal indicates that the bandwidth of the first signal is 1 RB, the terminal device determines, based on the bandwidth of the first signal, that the duration of the first symbol is 8.33 μs. The terminal device receives the first signal based on the bandwidth 1 RB of the first signal, and determines, based on the duration 8.33 μs of the first symbol, the information bit carried in the N first symbols in the first signal.

TABLE 5

| Duration (μs) of one first symbol | Bandwidth (RB) of the first signal |
| --- | --- |
| 8.33 | 1 |
| 5.55 | 2 |
| . . . | . . . |

Optionally, if the second signal indicates one piece of duration of the first symbol, the terminal device determines the duration of the first symbol based on the second signal after receiving the second signal, and then determines, based on the duration of the first symbol, the bandwidth of the first signal that is associated with the duration of the first symbol.

For example, it is assumed that an association relationship between the bandwidth of the first signal and the duration of the first symbol is shown in the foregoing Table 1. If the second signal indicates that the duration of the first symbol is 5.55 μs, the terminal device determines, based on the duration of the first symbol, that the bandwidth of the first signal is 2 RBs. Subsequently, the terminal device receives the first signal based on the bandwidth 2 RBs of the first signal, and determines, based on the duration 5.55 μs of the first symbol, the information bit carried in the N first symbols in the first signal.

Optionally, if the second signal indicates one of the bandwidth of the first signal and the duration(s) of the at least one first symbol that is associated with the bandwidth of the first signal, the terminal device determines, based on the second signal after receiving the second signal, one of the bandwidth of the first signal and the duration(s) of the at least one first symbol that is associated with the bandwidth of the first signal.

For example, it is assumed that an association relationship between the bandwidth of the first signal and the duration of the first symbol is shown in the foregoing Table 1. If the second signal indicates that the bandwidth of the first signal is 2 RBs, the duration of the first symbol is 5.55 μs. The terminal device receives the first signal based on the bandwidth 2 RBs of the first and determines, based on the duration 5.55 μs of the first symbol, the information bit carried in the N first symbols in the first signal.

In a possible implementation, the second signal further indicates a first field, and the first field includes one or more of: a coding multiple of a line code of the first signal, a channel coding code rate of the first signal, or a quantity of bit repetitions of the first signal. Correspondingly, a specific implementation in which the terminal device determines, based on the duration of the first symbol, the information bit carried in the N first symbols is as follows: The terminal device determines, based on the duration of the first symbol and the first field, the information bit carried in the N first symbols. In this possible implementation, line code coding, repetition coding, and/or channel coding are/is introduced, so that information transmission performance can be further improved. In addition, based on this possible implementation, the network device may indicate the coding multiple of the line code of the first signal, the channel coding code rate of the first signal, or the quantity of the bit repetitions of the first signal. The coding multiple of the line code of the first signal, the channel coding code rate of the first signal, or the quantity of the bit repetitions of the first signal may be adjusted instead of being fixed. This can improve flexibility of information transmission.

Optionally, the coding multiple of the line code of the first signal may be one of 2, 4, and 8, the channel coding code rate of the first signal may be one of ½, ¼, and ⅛, the channel coding may be one of polar code or convolutional code, and the quantity of bit repetitions of the first signal may be one of 1, 4, 8, 16, and 64.

For example, when the bandwidth of the first signal is 2 RBs, and the duration of the first symbol is 8.33 μs, the coding multiple of the line code of the first signal that is included in the first field is 2, where the coding multiple of the line code may also be a coding factor of the line code, and specifically, refer to a quantity of bits after line code coding is performed on one information bit. Alternatively, when the bandwidth of the first signal is 2 RBs, and the duration of the first symbol is 4.16 μs, the coding multiple of the line code of the first signal that is included in the first field is 4. Alternatively, when the bandwidth of the first signal is 2 RBs, and the duration of the first symbol is 4.16 μs, the coding multiple of the line code of the first signal that is included in the first field is 2, and the channel coding code rate of the first signal is ½.

In the three combination modes, the information transmission rate is the same. However, as shown in FIG. 9, when a target BLER is $10^{-2}$, it is clear that the SNR values corresponding to the three combination manners are different. Information transmission performance of a third combination manner is greater than information transmission performance of a second combination manner, and the information transmission performance of the second combination manner is greater than information transmission performance of a first combination manner. The network device may properly select a combination manner based on a requirement of the terminal device for information transmission performance, and indicate the combination manner to the terminal device.

In another possible implementation, the coding multiple of the line code of the first signal, the channel coding code rate of the first signal, and/or the quantity of the bit repetitions of the first signal may alternatively be predefined. In this way, the first network device does not need to indicate the first field to the terminal device. In this way, signaling overheads are reduced.

The following describes two specific implementations of the second signal.

Manner 1: The second signal is further used by the terminal device to perform time and frequency synchronization. That is, the second signal may be a synchronization signal. By using the synchronization signal, the bandwidth of the first signal and/or one of the duration(s) of the at least one first symbol that is associated with the bandwidth of the first signal can be more flexibly and dynamically adjusted, thereby improving flexibility of data signal transmission.

When the second signal is a signal used by the terminal device to perform time and frequency synchronization, the second signal may indicate, in the following two manners, the bandwidth of the first signal and/or one of the duration(s) of the at least one first symbol that is associated with the bandwidth of the first signal.

(1) The second signal includes M same third signals in time domain, a value of M indicates the bandwidth of the first signal and/or one of the duration(s) of the at least one first symbol that is associated with the bandwidth of the first signal, and M is a positive integer. Based on this manner, the bandwidth of the first signal and/or one of the duration(s) of the at least one first symbol that is associated with the bandwidth of the first signal can be accurately indicated.

For example, the second signal indicates the bandwidth of the first signal and one of the duration(s) of the at least one first symbol that is associated with the bandwidth of the first signal. It is assumed that an association relationship between the bandwidth of the first signal and the duration of the first symbol is shown in the foregoing Table 1. If the second signal includes one third signal in time domain, the second signal indicates that the bandwidth of the first signal is 1 RB, and the duration of the first symbol is 66.7 µs. If the second signal includes two third signals in time domain, the second signal indicates that the bandwidth of the first signal is 1 RB, and the duration of the first symbol is 33.35 µs. If the second signal includes three third signals in time domain, the second signal indicates that the bandwidth of the first signal is 1 RB, and the duration of the first symbol is 16.67 µs. If the second signal includes four third signals in time domain, the second signal indicates that the bandwidth of the first signal is 1 RB, and the duration of the first symbol is 8.33 µs. If the second signal includes five third signals in time domain, the second signal indicates that the bandwidth of the first signal is 2 RBs, and the duration of the first symbol is 5.55 µs. If the second signal includes six third signals in time domain, the second signal indicates that the bandwidth of the first signal is 2 RBs, and the duration of the first symbol is 4.16 µs. If the second signal includes seven third signals in time domain, the second signal indicates that the bandwidth of the first signal is 2 RBs, and the duration of the first symbol is 3.33 µs. When detecting the second signal, the terminal device performs correlation detection by using a third signal [S], and determines, based on a quantity of occurrences of a correlation peak, a quantity of third signals included in the second signal.

(2) The second signal includes M same third signals, time domain masks on the M third signals indicate the bandwidth of the first signal and/or one of the duration(s) of the at least one first symbol that is associated with the bandwidth of the first signal, and M is a positive integer. Based on this manner, through time domain mask indication information superimposed on a plurality of concatenated same synchronization signals, flexibility of dynamically adjusting data signal transmission can be improved as much as possible when ensuring time-frequency synchronization performance of the terminal device.

For example, the second signal indicates the bandwidth of the first signal and one of the duration(s) of the at least one first symbol that is associated with the bandwidth of the first signal. The third signal is [S], and negation of the third signal is [S̄]. Negation specifically means that all elements whose bits are 1 in the third signal [S] are set to 0, and all elements whose bits are 0 are set to 1. If M is 3, the three third signals are [S S S], and adding different time domain masks to time domains of the three third signals [S S S] may indicate different information. When M is 3, there are eight types of time domain masks: [+1+1+1], [+1+1−1], [+1−1+1], [+1−1−1], [−1+1+1], [−1+1−1], [−1−1+1] and [−1−1−1]. It is assumed that an association relationship between the bandwidth of the first signal and the duration of the first symbol is shown in the foregoing Table 1. [+1+1+1] indicates that the bandwidth of the first signal is 1 RB, and the duration of the first symbol is 66.7 µs. [+1+1−1] indicates that the bandwidth of the first signal is 1 RB, and the duration of the first symbol is 33.35 µs. [+1−1+1] indicates that the bandwidth of the first signal is 1 RB, and the duration of the first symbol is 16.67 µs. [+1−1−1] indicates that the bandwidth of the first signal is 1 RB, and the duration of the first symbol is 8.33 µs. [−1+1+1] indicates that the bandwidth of the first signal is 2 RBs, and the duration of the first symbol is 5.55 µs. [−1+1−1] indicates that the bandwidth of the first signal is 2 RBs, and the duration of the first symbol is 4.16 µs. [−1−1+1] indicates that the bandwidth of the first signal is 2 RBs, and the duration of the first symbol is 3.33 µs. After the eight time domain masks are added to the time domain of the three third signals [S S S], [S S S], [S S S̄], [S S̄ S], [S S̄ S̄], [S̄ S S], [S̄ S S̄], [S̄ S̄ S] and [S̄ S̄ S̄] are respectively obtained. When detecting the second signal, the terminal device performs correlation detection by using the third signal [S], to determine the time domain masks on the M third signals. The terminal device determines, based on the time domain masks on the M third signals, one of the bandwidth of the first signal and the duration(s) of the at least one first symbol that is associated with the bandwidth of the first signal.

In a possible implementation, the second signal includes Q second symbols, a modulation scheme of the second symbol is ASK modulation or OOK modulation, Q is a positive integer, the second signal is an OFDM signal, and there is an association relationship between a bandwidth of the second signal and a duration of one second symbol. The terminal device may further determine, based on the duration of the second symbol that is associated with the bandwidth of the second signal, an information bit carried in the Q second symbols.

In this possible implementation, the second signal is a signal used by the terminal device to perform time and frequency synchronization. There is also an association relationship between the bandwidth of the second signal and the duration of the second symbol, so that the second signal can be transmitted by using a small bandwidth when information transmission efficiency and information transmission performance are ensured, thereby improving network frequency domain resource utilization.

In a possible implementation, the bandwidth of the second signal and the duration of the second symbol that is associated with the bandwidth of the second signal are predefined. In other words, the bandwidth of the second signal and the duration of the second symbol may be fixed. For example, the bandwidth of the second signal is fixed at 1 RB, and the duration of the second symbol is fixed at 5.55 μs, for example, as shown in FIG. 10.

Manner 2: The second signal is further used to carry RRC signaling or MAC signaling sent by the first network device. Transmission of a data signal is adjusted in a semi-static manner. For a terminal device with low mobility, signaling overheads can be reduced, and transmission of a data signal can be maintained for a period of time.

Optionally, the RRC signaling may be RRC release signaling, RRC reestablishment signaling, or RRC resume signaling; or may be RRC signaling sent by the first network device in RRC connected mode, or the like. Alternatively, the RRC signaling may be one of select signaling, query signaling, query repeat (queryrep) signaling, or query adjust (queryadjust) signaling in a passive IoT.

Figure 11:
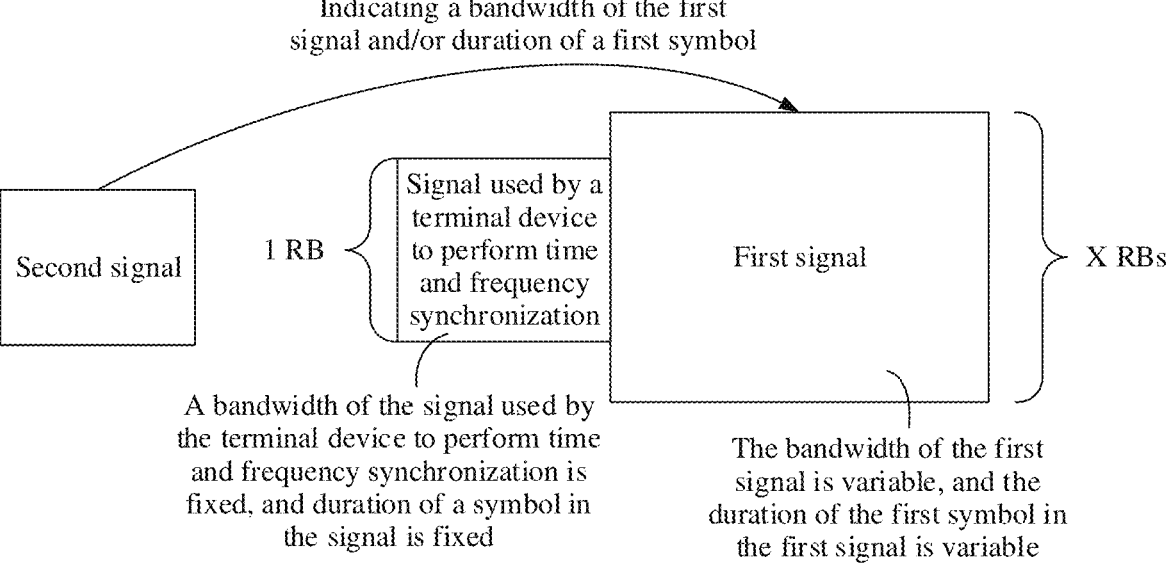
FIG. 11 is another diagram of an example signal bandwidth and symbol duration according to an embodiment of the present disclosure.

Optionally, if the second signal is further used to carry RRC signaling or MAC signaling sent by the first network device, a bandwidth of a subsequently transmitted signal used by the terminal device to perform time-frequency synchronization and a duration of an ASK/OOK modulation symbol in the signal used by the terminal device to perform time-frequency synchronization remain unchanged. The second signal affects only the bandwidth of the subsequent first signal and a duration of the first symbol in the first signal, for example, as shown in FIG. 11. In this way, if the bandwidth of the first signal and the duration of the first symbol in the first signal need to be adjusted subsequently, the terminal device may be dynamically notified of the bandwidth of the first signal and the duration of the first symbol in the first signal by using a signal used by the terminal device to perform time-frequency synchronization. Therefore, based on this optional manner, the bandwidth of the first signal and the duration of the first symbol in the first signal can be flexibly adjusted.

Figure 12:
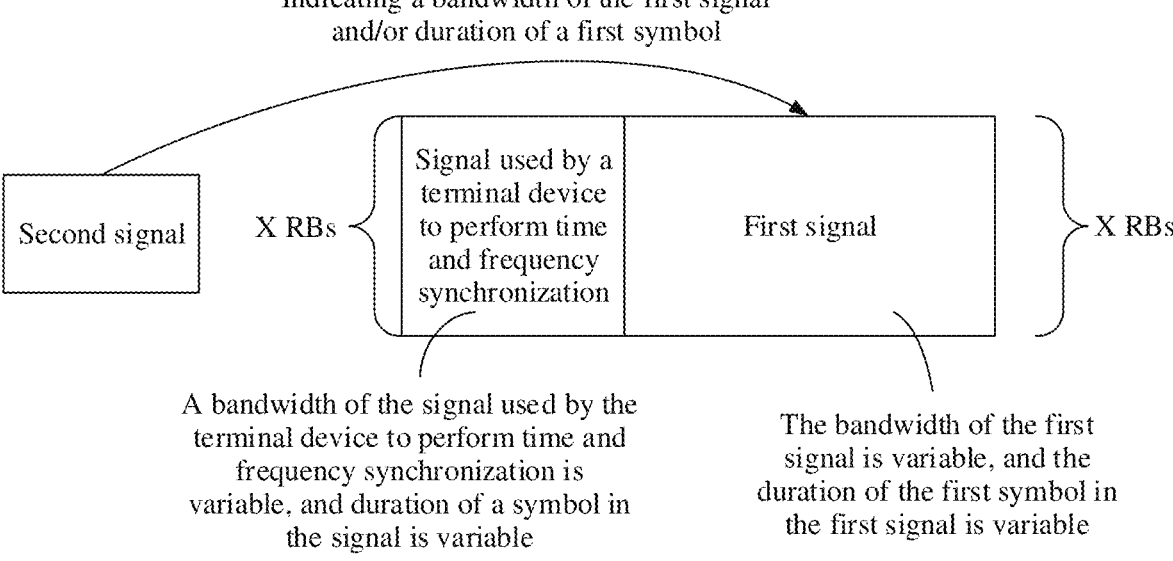
FIG. 12 is still another diagram of an example signal bandwidth and symbol duration according to an embodiment of the present disclosure.

Optionally, if the second signal is further used to carry RRC signaling or MAC signaling sent by the first network device, a bandwidth of a subsequently transmitted synchronization signal and a duration of an ASK/OOK modulation symbol in the synchronization signal are affected by the second signal, and the second signal affects receiving of the subsequently transmitted synchronization signal and the first signal. That is, a bandwidth of a subsequent signal used by the terminal device to perform time and frequency synchronization is the same as a bandwidth of the first signal. The duration of the ASK/OOK modulation symbol in the signal used by the terminal device to perform time and frequency synchronization is the same as the duration of the first symbol in the first signal, for example, as shown in FIG. 12.

802: The first network device sends the first signal to the terminal device, where the first signal includes N first symbols, a modulation scheme of the first symbol is ASK modulation or OOK modulation, N is a positive integer, the first signal is an OFDM signal, and the duration of the first symbol is one of duration(s) of at least one first symbol that is associated with the bandwidth of the first signal.

803: The terminal device receives, based on the bandwidth of the first signal, the first signal sent by the first network device.

804: The terminal device determines the duration of the first symbol.

805: The terminal device determines, based on the duration of the first symbol, an information bit carried in the N first symbols.

For specific implementations of step 802 to step 805, refer to the foregoing specific implementations of step 401 to step 404.

It can be learned that based on the method described in FIG. 8, the network device can flexibly indicate, to the terminal device, the bandwidth of the first signal and/or one of the duration(s) of the at least one first symbol that is associated with the bandwidth of the first signal. In this way, there may be a plurality of adjustable types of information transmission rates, and information transmission is more flexible.

Figure 13:
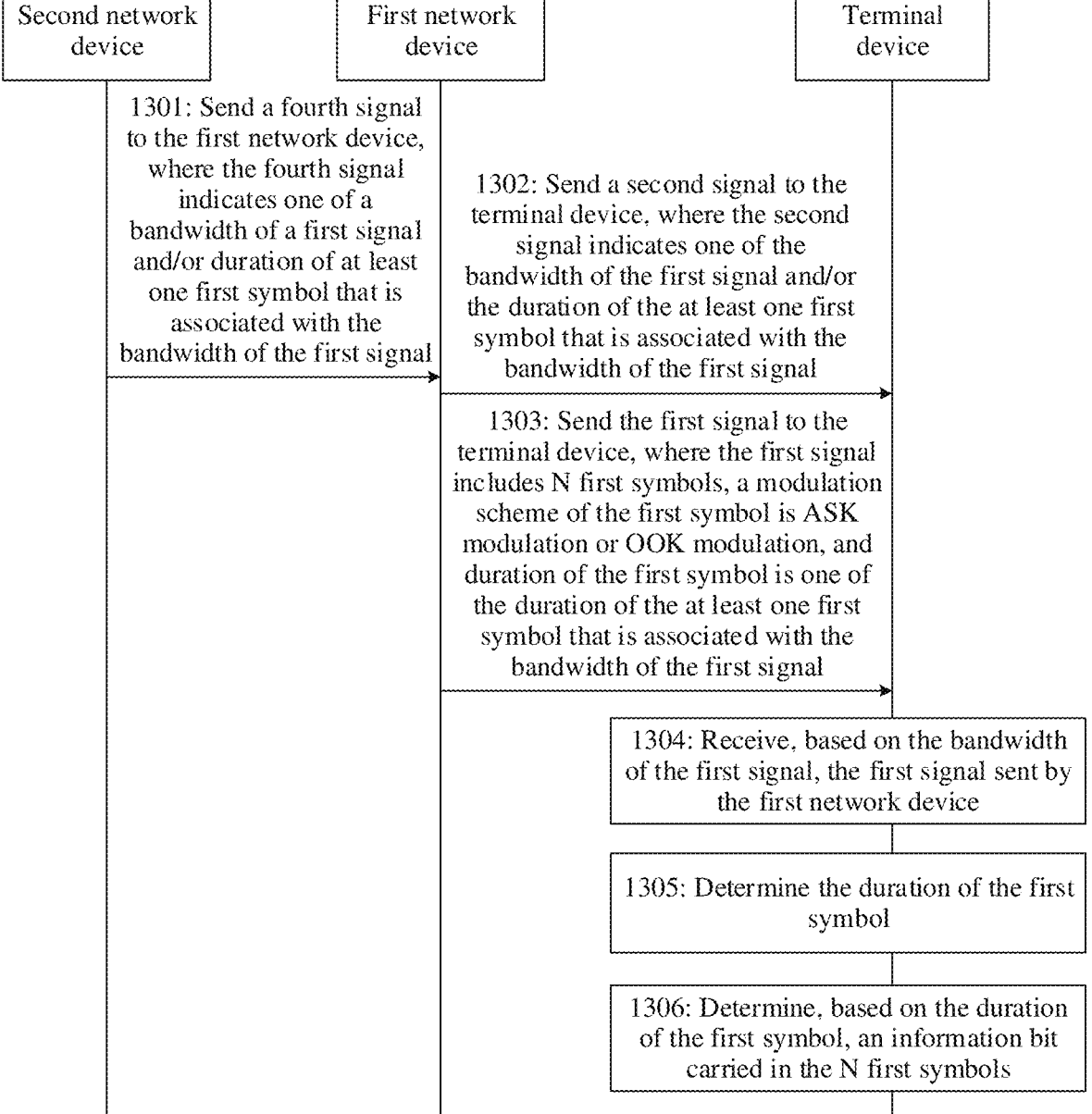
FIG. 13 is a diagram of still another example information transmission method according to an embodiment of the present disclosure.

FIG. 13 is a schematic flowchart of an information transmission method according to an embodiment of the present disclosure. As shown in FIG. 13, the information transmission method includes the following steps 1301 to 1306. The method shown in FIG. 13 may be performed by a terminal device, a first network device (an access network device), and a second network device (a core network device), or may be performed by a chip in a terminal device, a chip in a first network device, and a chip in a second network device. In FIG. 13, an example in which the method is performed by the terminal device and the first network device is used for description. In addition, processing performed by a single execution body shown in FIG. 13 may alternatively be performed by a plurality of execution bodies through division, and these execution bodies are logically and/or physically separated. For example, processing performed by an access network device may be performed by at least one of a central unit (CU), a distributed unit (DU), and a radio unit (RU) through division.

1301: The second network device sends a fourth signal to the first network device, where the fourth signal indicates a bandwidth of a first signal and/or one of duration(s) of at least one first symbol that is associated with the bandwidth of the first signal. Correspondingly, the first network device may receive the fourth signal.

1302: The first network device sends a second signal to the terminal device, where the second signal indicates the bandwidth of the first signal and/or one of the duration(s) of the at least one first symbol that is associated with the bandwidth of the first signal. Correspondingly, the terminal device may receive the second signal.

In this embodiment, after receiving the fourth signal, the first network device sends the second signal to the terminal device based on the fourth signal. For example, if the fourth signal indicates that the bandwidth of the first signal is 2 RBs, and the duration of the first symbol is 5.55 μs, the second signal indicates that the bandwidth of the first signal is 2 RBs, and the duration of the first symbol is 5.55 μs.

In other words, the bandwidth of the first signal and/or the duration of the first symbol that is associated with the bandwidth of the first signal that are/is indicated by the first network device to the terminal device are/is indicated by the second network device to the first network device.

Optionally, the fourth signal is further used to carry RRC signaling or MAC signaling. Optionally, the RRC signaling may be RRC release signaling, RRC reestablishment signaling, RRC resume signaling, or the like.

For related descriptions of the second signal, refer to the descriptions in the embodiment corresponding to FIG. 8.

1303: The first network device sends the first signal to the terminal device, where the first signal includes N first symbols, a modulation scheme of the first symbol is ASK modulation or OOK modulation, N is a positive integer, the first signal is an OFDM signal, and the duration of the first symbol is one of duration(s) of at least one first symbol that is associated with the bandwidth of the first signal.

1304: The terminal device receives, based on the bandwidth of the first signal, the first signal sent by the first network device.

1305: The terminal device determines the duration of the first symbol.

1306: The terminal device determines, based on the duration of the first symbol, an information bit carried in the N first symbols.

For specific implementations of step 1302 to step 1306, refer to the foregoing specific implementations of step 801 to step 805.

Figure 14:
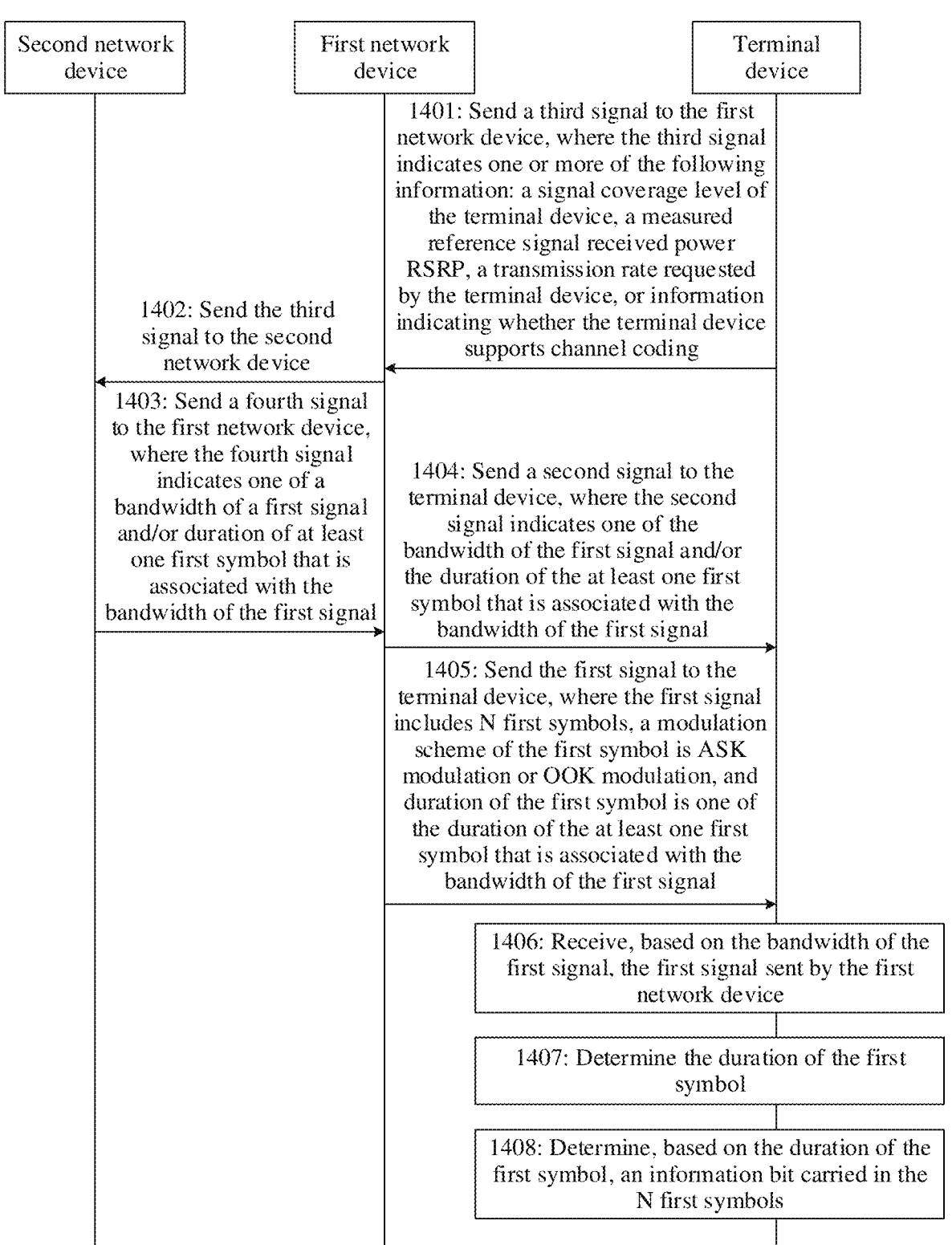
FIG. 14 is a diagram of yet another example information transmission method according to an embodiment of the present disclosure.

FIG. 14 is a schematic flowchart of an information transmission method according to an embodiment of the present disclosure. As shown in FIG. 14, the information transmission method includes the following 1401 to 1408. The method shown in FIG. 14 may be performed by a terminal device, a first network device (an access network device), and a second network device (a core network device), or may be performed by a chip in a terminal device, a chip in a first network device, and a chip in a second network device. In FIG. 14, an example in which the method is performed by a terminal device, a first network device, and a second network device is used for description. In addition, processing performed by a single execution body shown in FIG. 14 may alternatively be performed by a plurality of execution bodies through division, and these execution bodies are logically and/or physically separated. For example, processing performed by an access network device may be performed by at least one of a central unit (CU), a distributed unit (DU), and a radio unit (RU) through division.

1401: The terminal device sends a third signal to the first network device, where the third signal indicates one or more of: a signal coverage level of the terminal device, a measured reference signal received power (RSRP), a transmission rate requested by the terminal device, or information indicating whether the terminal device supports channel coding. Correspondingly, the first network device may receive the third signal.

Optionally, the third signal may further indicate a range of a transmission rate supported by the terminal device.

1402: The first network device sends the third signal to the second network device. Correspondingly, the second network device may receive the third signal.

1403: The second network device sends a fourth signal to the first network device, where the fourth signal indicates a bandwidth of a first signal and/or one of duration(s) of at least one first symbol that is associated with the bandwidth of the first signal. Correspondingly, the first network device may receive the fourth signal.

In this embodiment, after receiving the third signal, the second network device may determine, based on the third signal, the bandwidth of the first signal and/or one of the duration(s) of the at least one first symbol that is associated with the bandwidth of the first signal. Then, the second network device sends a fourth signal to the first network device, where the fourth signal indicates a bandwidth of a first signal and/or one of duration(s) of at least one first symbol that is associated with the bandwidth of the first signal.

After step 1401 and step 1402 are performed, the network device can select an optimal duration of the first symbol for the terminal device for transmission based on an actual coverage level, an actual channel decoding capability, and the like when a coverage requirement is met, thereby ensuring a high information transmission rate.

1404: The first network device sends a second signal to the terminal device, where the second signal indicates the bandwidth of the first signal and/or one of the duration(s) of the at least one first symbol that is associated with the bandwidth of the first signal. Correspondingly, the terminal device may receive the second signal.

1405: The first network device sends a first signal to the terminal device, where the first signal includes N first symbols, a modulation scheme of the first symbol is ASK modulation or OOK modulation, N is a positive integer, the first signal is an OFDM signal, and the duration of the first symbol is one of duration(s) of at least one first symbol that is associated with the bandwidth of the first signal.

1406: The terminal device receives, based on the bandwidth of the first signal, the first signal sent by the first network device.

1407: The terminal device determines the duration of the first symbol.

1408: The terminal device determines, based on the duration of the first symbol, an information bit carried in the N first symbols.

For specific implementations of step 1403 to step 1408, refer to the foregoing specific implementations of step 1301 to step 1306.

Figure 15:
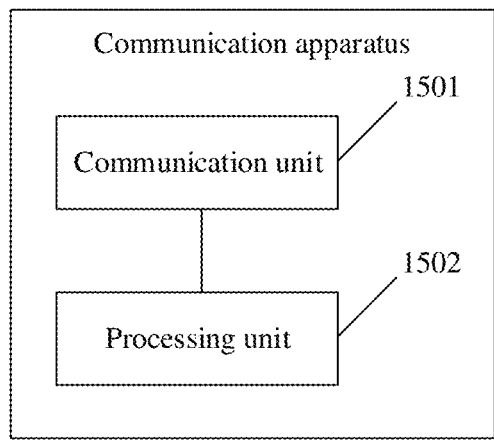
FIG. 15 is a diagram of a structure of an example communication apparatus according to an embodiment of the present disclosure.

FIG. 15 is a diagram of a structure of a communication apparatus according to an embodiment of the present disclosure. The communication apparatus shown in FIG. 15 may be configured to perform some or all functions of the terminal device in the method embodiment described in FIG. 4, FIG. 8, FIG. 13, or FIG. 14. The apparatus may be a terminal device, may be an apparatus in the terminal device, or may be an apparatus that can be used together with a terminal device. The communication apparatus may alternatively be a chip system. The communication apparatus shown in FIG. 15 may include a communication unit 1501 and a processing unit 1502. The processing unit 1502 is configured to process data. A receiving unit and a sending unit are integrated into the communication unit 1501. The communication unit 1501 may also be referred to as a transceiver unit. Alternatively, the communication unit 1501 may be split into a receiving unit and a sending unit.

The communication unit 1501 is configured to receive, based on a bandwidth of a first signal, the first signal sent by a first network device, where the first signal includes N first symbols, a modulation scheme of the first symbol is amplitude shift keying (ASK) modulation or on-off keying (OOK) modulation, N is a positive integer, and the first signal is an orthogonal frequency division multiplexing (OFDM) signal.

The processing unit 1502 is configured to determine a duration of the first symbol, where the duration of the first symbol is one of duration of at least one first symbol that is associated with the bandwidth of the first signal.

The processing unit 1502 is further configured to determine, based on the duration of the first symbol, an information bit carried in the N first symbols.

In a possible implementation, the duration(s) of the at least one first symbol that is associated with the bandwidth of the first signal is predefined; or the duration(s) of the at least one first symbol that is associated with the bandwidth of the first signal is configured by the first network device by using configuration information, and the configuration information is carried in radio resource control (RRC) signaling or media access control (MAC) signaling.

In a possible implementation, the communication unit 1501 is further configured to receive a second signal, where the second signal indicates the bandwidth of the first signal and/or one of the duration(s) of the at least one first symbol that is associated with the bandwidth of the first signal.

In a possible implementation, the second signal further indicates a first field, and the first field includes one or more of: a coding multiple of a line code of the first signal, a channel coding code rate of the first signal, or a quantity of bit repetitions of the first signal. A manner in which the processing unit 1502 determines, based on the duration of the first symbol, the information bit carried in the N first symbols is specifically: determining, based on the duration of the first symbol and the first field, the information bit carried in the N first symbols.

In a possible implementation, the second signal is further used by the terminal device to perform time and frequency synchronization.

In a possible implementation, the second signal includes M same third signals in time domain, a value of M indicates the bandwidth of the first signal and/or one of the duration(s) of the at least one first symbol that is associated with the bandwidth of the first signal, and M is a positive integer.

In a possible implementation, the second signal includes M same third signals, time domain masks on the M third signals indicate the bandwidth of the first signal and/or one of the duration(s) of the at least one first symbol that is associated with the bandwidth of the first signal, and M is a positive integer.

In a possible implementation, the second signal includes Q second symbols, a modulation scheme of the second symbol is ASK modulation or OOK modulation, Q is a positive integer, the second signal is an OFDM signal, and there is an association relationship between a bandwidth of the second signal and a duration of one second symbol. The processing unit 1502 is further configured to determine, based on the duration of the second symbol that is associated with the bandwidth of the second signal, an information bit carried in the Q second symbols.

In a possible implementation, the bandwidth of the second signal and the duration of the second symbol that is associated with the bandwidth of the second signal are predefined.

In a possible implementation, the second signal is further used to carry RRC signaling or MAC signaling sent by the first network device.

FIG. 15 is a diagram of a structure of a communication apparatus according to an embodiment of the present disclosure. The communication apparatus shown in FIG. 15 may be configured to perform some or all functions of the first network device in the method embodiment described in FIG. 4, FIG. 8, FIG. 13, or FIG. 14. The apparatus may be a first network device, or may be an apparatus in the first network device, or an apparatus that can be used in matching with the first network device. The communication apparatus may alternatively be a chip system. The communication apparatus shown in FIG. 15 may include a communication unit 1501 and a processing unit 1502. The processing unit 1502 is configured to process data. A receiving unit and a sending unit are integrated into the communication unit 1501. The communication unit 1501 may also be referred to as a transceiver unit. Alternatively, the communication unit 1501 may be split into a receiving unit and a sending unit.

The communication unit 1501 is configured to send a first signal to a terminal device, where the first signal includes N first symbols, a modulation scheme of the first symbol is amplitude shift keying (ASK) modulation or on-off keying (OOK) modulation, N is a positive integer, the first signal is an orthogonal frequency division multiplexing (OFDM) signal, and the duration of the first symbol is one of the duration(s) of the at least one first symbol that is associated with a bandwidth of the first signal.

In a possible implementation, the duration(s) of the at least one first symbol that is associated with the bandwidth of the first signal is predefined; or the duration(s) of the at least one first symbol that is associated with the bandwidth of the first signal is configured by the first network device by using configuration information, and the configuration information is carried in radio resource control (RRC) signaling or media access control (MAC) signaling.

In a possible implementation, the communication unit 1501 is further configured to send a second signal to the terminal device, where the second signal indicates the bandwidth of the first signal and/or one of the duration(s) of the at least one first symbol that is associated with the bandwidth of the first signal.

In a possible implementation, the second signal further indicates a first field, and the first field includes one or more of: a coding multiple of a line code of the first signal, a channel coding code rate of the first signal, or a quantity of bit repetitions of the first signal.

In a possible implementation, the second signal is further used by the terminal device to perform time and frequency synchronization.

In a possible implementation, the second signal includes M same third signals in time domain, a value of M indicates the bandwidth of the first signal and/or one of the duration(s) of the at least one first symbol that is associated with the bandwidth of the first signal, and M is a positive integer.

In a possible implementation, the second signal includes M same third signals, time domain masks on the M third signals indicate the bandwidth of the first signal and/or one of the duration(s) of the at least one first symbol that is associated with the bandwidth of the first signal, and M is a positive integer.

In a possible implementation, the second signal includes Q second symbols, a modulation scheme of the second symbol is ASK modulation or OOK modulation, Q is a positive integer, the second signal is an OFDM signal, and there is an association relationship between a bandwidth of the second signal and a duration of one second symbol.

In a possible implementation, the bandwidth of the second signal and the duration of the second symbol that is associated with the bandwidth of the second signal are predefined.

In a possible implementation, the second signal carries RRC signaling or MAC signaling sent by the first network device.

In a possible implementation, the communication unit 1501 is further configured to: before sending the second signal to the terminal device, receive a fourth signal sent by a second network device, where the fourth signal indicates the bandwidth of the first signal and/or one of the duration(s) of the at least one first symbol that is associated with the bandwidth of the first signal.

In a possible implementation, the communication unit 1501 is further configured to: before receiving the fourth signal sent by the second network device, receive a third signal sent by the terminal device, where the third signal indicates one or more of: a signal coverage level of the terminal device, a measured reference signal received power (RSRP), a transmission rate requested by the terminal device, or information indicating whether the terminal device supports channel coding; and send the third signal to the second network device.

Figure 16:
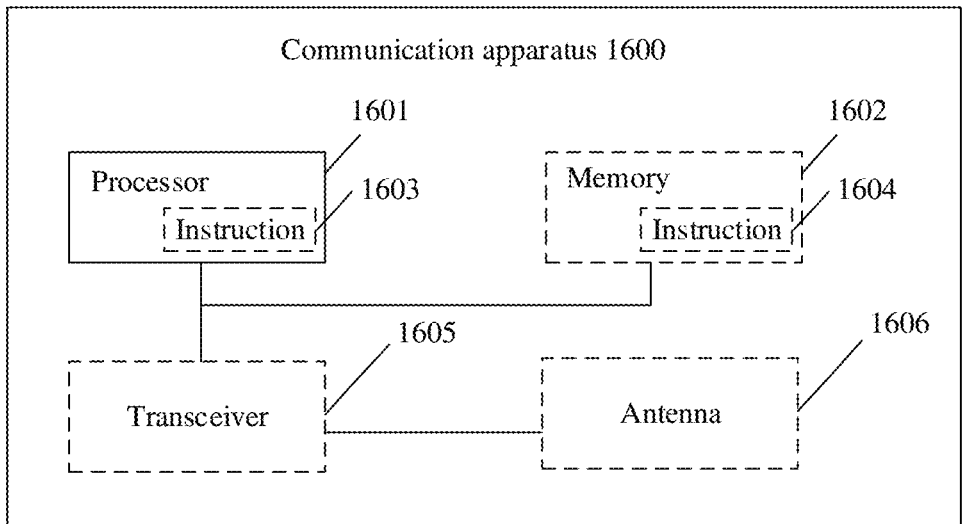
FIG. 16 is a diagram of a structure of another example communication apparatus according to an embodiment of the present disclosure.

FIG. 16 is a diagram of a structure of a communication apparatus. The communication apparatus 1600 may be the terminal device in the foregoing method embodiments, or may be the first network device in the foregoing method embodiments, or may be a chip, a chip system, a processor, or the like that supports the terminal device in implementing the foregoing method, or may be a chip, a chip system, a processor, or the like that supports the first network device in implementing the foregoing method. The communication apparatus may be configured to implement the method described in the foregoing method embodiment. For details, refer to the descriptions in the foregoing method embodiment.

The communication apparatus 1600 may include one or more processors 1601. The processor 1601 may be a general-purpose processor, a dedicated processor, or the like. For example, the processor 1601 may be a baseband processor or a central processing unit. The baseband processor may be configured to process a communication protocol and communication data. The central processing unit may be configured to: control a communication apparatus (for example, a base station, a baseband chip, a terminal, a terminal chip, a DU, or a CU), execute a software program, and process data of the software program.

Optionally, the communication apparatus 1600 may include one or more memories 1602. The memory 1602 stores instructions 1604, and the instructions may be run on the processor 1601, to enable the communication apparatus 1600 to perform the methods described in the foregoing method embodiments. Optionally, the memory 1602 may further store data. The processor 1601 and the memory 1602 may be separately disposed, or may be integrated together.

Optionally, the communication apparatus 1600 may further include a transceiver 1605 and an antenna 1606. The transceiver 1605 may be referred to as a transceiver unit, a transceiver machine, a transceiver circuit, or the like, and is configured to implement a transceiver function. The transceiver 1605 may include a receiver and a transmitter. The receiver may be referred to as a receiving machine, a receiver circuit, or the like, and is configured to implement a receiving function. The transmitter may be referred to as a transmitting machine, a transmitter circuit, or the like, and is configured to implement a sending function. The processing unit 1502 shown in FIG. 15 may be the processor 1601. The communication unit 1501 may be the transceiver 1605.

The communication apparatus 1600 is a terminal device, and the processor 1601 is configured to perform a data processing operation of the terminal device in the foregoing method embodiments. The transceiver 1605 is configured to perform data receiving and sending operations of the terminal device in the foregoing method embodiments. For example, the transceiver 1605 may be configured to perform data receiving and sending operations of the terminal device in FIG. 4, FIG. 8, FIG. 13, or FIG. 14. The processor 1601 may be configured to perform a data processing operation of the terminal device in FIG. 4, FIG. 8, FIG. 13, or FIG. 14.

The communication apparatus 1600 is a first network device, and the processor 1601 is configured to perform a data processing operation of the first network device in the foregoing method embodiments. The transceiver 1605 is configured to perform data sending and receiving operations of the first network device in the foregoing method embodiment. For example, the transceiver 1605 may be configured to perform data receiving and sending operations of the first network device in FIG. 4, FIG. 8, FIG. 13, or FIG. 14. The processor 1601 may be configured to perform a data processing operation of the first network device in FIG. 4, FIG. 8, FIG. 13, or FIG. 14.

In another example embodiment, the processor 1601 may include a transceiver configured to implement receiving and sending functions. For example, the transceiver may be a transceiver circuit, an interface, or an interface circuit. The transceiver circuit, the interface, or the interface circuit configured to implement the receiving and sending functions may be separated, or may be integrated together. The transceiver circuit, the interface, or the interface circuit may be configured to read and write code/data. Alternatively, the transceiver circuit, the interface, or the interface circuit may be configured to transmit or transfer a signal.

In still another example embodiment, optionally, the processor 1601 may store instructions 1603, and the instructions 1603 are run on the processor 1601, so that the communication apparatus 1600 can perform the methods described in the foregoing method embodiments. The instructions 1603 may be fixed in the processor 1601, and in this case, the processor 1601 may be implemented by hardware.

In yet another example embodiment, the communication apparatus 1600 may include a circuit. The circuit may implement a sending, receiving, or communication function in the foregoing method embodiments. The processor and the transceiver described in this embodiment may be implemented on an integrated circuit (IC), an analog IC, a radio frequency integrated circuit RFIC, a hybrid signal IC, an application-specific integrated circuit (ASIC), a printed circuit board (PCB), an electronic device, or the like. The processor and the transceiver may alternatively be manufactured by using various IC technologies, for example, a complementary metal oxide semiconductor (CMOS), an N-type metal oxide semiconductor (nMetal-oxide-semiconductor, NMOS), a p-type metal oxide semiconductor (positive channel metal oxide semiconductor, PMOS), a bipolar junction transistor (BJT), a bipolar CMOS (BiCMOS), silicon germanium (SiGe), and gallium arsenide (GaAs).

The communication apparatus described in the foregoing embodiment may be the first communication device or the second communication device. However, a scope of the communication apparatus described in embodiments of the present disclosure is not limited thereto, and a structure of the communication apparatus may not be limited by FIG. 16. The communication apparatus may be an independent device or may be a part of a large device. For example, the communication apparatus may be:

(1) an independent integrated circuit IC, a chip, or a chip system or subsystem;

(2) a set that has one or more ICs, where optionally, the IC set may alternatively include a storage component configured to store data and instructions;

(3) an ASIC, for example, a modem (MSM);

(4) a module that can be embedded in another device;

(5) a receiver, a terminal, an intelligent terminal, a cellular phone, a wireless device, a handheld device, a mobile unit, a vehicle-mounted device, a network device, a cloud device, an artificial intelligence device, or the like; or (6) another device or the like.

Figure 17:
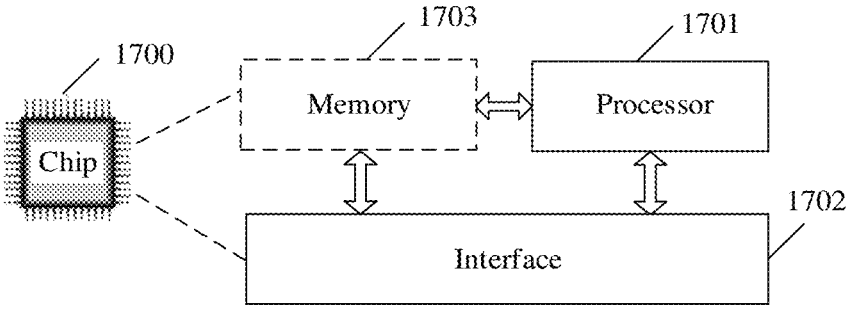
FIG. 17 is a diagram of a structure of an example chip according to an embodiment of the present disclosure.

For a case in which the communication apparatus may be a chip or a chip system, refer to a diagram of a structure of a chip shown in FIG. 17. The chip 1700 shown in FIG. 17 includes a processor 1701 and an interface 1702. Optionally, the chip 1700 may further include a memory 1703. There may be one or more processors 1701, and there may be a plurality of interfaces 1702.

In a design, for a case in which the chip is configured to implement a function of the first terminal device in this embodiment:

The interface 1702 is configured to receive or output a signal. For example, the interface 1702 may be configured to perform a signal receiving or output operation of the terminal device in FIG. 4, FIG. 8, FIG. 13, or FIG. 14.

The processor 1701 is configured to perform a data processing operation of the first communication device. For example, the processor 1701 may be configured to perform a data processing operation of the terminal device in FIG. 4, FIG. 8, FIG. 13, or FIG. 14.

In another design, for a case in which the chip is configured to implement a function of the first network device in this embodiment.

The interface 1702 is configured to receive or output a signal. For example, the interface 1702 may be configured to perform a signal receiving or output operation of the first network device in FIG. 4, FIG. 8, FIG. 13, or FIG. 14.

The processor 1701 is configured to perform a data processing operation of a network device. For example, the processor 1701 may be configured to perform a data processing operation of the first network device in FIG. 4, FIG. 8, FIG. 13, or FIG. 14.

It may be understood that, in some scenarios, some optional features in embodiments of the present disclosure may be independently implemented without depending on another feature, for example, a solution on which the optional features are currently based, to resolve a corresponding technical problem and achieve a corresponding effect. Alternatively, in some scenarios, the optional features are combined with other features based on requirements. Correspondingly, the communication apparatus provided in embodiments of the present disclosure may also correspondingly implement these features or functions.

It should be noted that the processor in embodiments of the present disclosure may be an integrated circuit chip, and has a signal processing capability. In an implementation process, steps in the foregoing method embodiments can be implemented by using a hardware integrated logical circuit in the processor, or by using instructions in a form of software. The foregoing processor may be a general purpose processor, a digital signal processor (DSP), an application-specific integrated circuit (ASIC), a field programmable gate array (FPGA) or another programmable logic device, a discrete gate or transistor logic device, or a discrete hardware component.

It may be understood that the memory in this embodiment may be a volatile memory or a nonvolatile memory, or may include a volatile memory and a nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), used as an external cache. Through example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synchlink DRAM, SLDRAM), and a direct rambus dynamic random access memory (direct rambus RAM, DR RAM). It should be noted that the memory of the systems and methods described in this specification includes but is not limited to these and any memory of another proper type.

The present disclosure further provides a computer-readable medium. The storage medium stores a computer program or instructions. When the computer program is or the instructions are executed by a communication apparatus, a function in any one of the foregoing method embodiments is implemented.

The present disclosure further provides a computer program product including instructions. When a computer reads and executes the computer program product, the computer is enabled to implement a function in any one of the foregoing method embodiments.

All or some of the foregoing embodiments may be implemented by using software, hardware, firmware, or any combination thereof. When software is used to implement the embodiments, all or a part of the embodiments may be implemented in a form of a computer program product. The computer program product includes one or more computer instructions. When the computer instructions are loaded and executed on the computer, the procedure or functions according to the embodiments of the present disclosure are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a high-density digital video disc (digital video disc, DVD)), a semiconductor medium (for example, a solid state disk (SSD)), or the like.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. An information transmission method, comprising:
   receiving, by a terminal device or a chip in the terminal device based on a bandwidth of a first signal, the first signal sent by a first network device, wherein the first signal comprises N first symbols, a modulation scheme of each of the N first symbols is amplitude shift keying (ASK) modulation or on-off keying (OOK) modulation, N is a positive integer, and the first signal is an orthogonal frequency division multiplexing (OFDM) signal;
   determining, by the terminal device or the chip in the terminal device, a duration of each of the N first symbols, wherein the duration of the first symbol is one of duration(s) of at least one first symbol that is associated with the bandwidth of the first signal, wherein a duration of 33.3 µs of one of the at least one first symbol is associated with the bandwidth of the first signal that is greater than or equal to 1 RB or a duration of 5.55 µs of one of the at least one first symbol is associated with the bandwidth of the first signal that is greater than or equal to 2 RBs; and determining, by the terminal device or the chip in the terminal device based on the duration of the first symbol, an information bit carried in the N first symbols.

2. The method according to claim 1, wherein the duration(s) of the at least one first symbol that is associated with the bandwidth of the first signal is/are predefined; or the duration(s) of the at least one first symbol that is associated with the bandwidth of the first signal is/are configured by the first network device by using configuration information carried in radio resource control (RRC) signaling or media access control (MAC) signaling.

3. The method according to claim 1, further comprising:

receiving, by the terminal device or the chip in the terminal device, a second signal, wherein the second signal indicates the bandwidth of the first signal and/or one of the duration(s) of the at least one first symbol that is associated with the bandwidth of the first signal.

4. The method according to claim 3, wherein the second signal further indicates a first field, and the first field comprises one or more of: a coding multiple of a line code of the first signal, a channel coding code rate of the first signal, or a quantity of bit repetitions of the first signal; and the determining, by the terminal device or the chip in the terminal device based on the duration of the first symbol, an information bit carried in the N first symbols comprises:

determining, by the terminal device or the chip in the terminal device based on the duration of the first symbol and the first field, the information bit carried in the N first symbols.

5. The method according to claim 1, wherein a duration of 66.7 µs of one of the at least one first symbol is associated with the bandwidth of the first signal that is greater than or equal to 1 RB.

6. An information transmission method, comprising:

sending, by a first network device, a first signal to a terminal device, wherein the first signal comprises N first symbols, a modulation scheme of each of the N first symbols is amplitude shift keying (ASK) modulation or on-off keying (OOK) modulation, N is a positive integer, the first signal is an orthogonal frequency division multiplexing (OFDM) signal, and a duration of each of the N first symbols is one of duration(s) of at least one first symbol that is associated with a bandwidth of the first signal, wherein a duration of 33.3 µs of one of the at least one first symbol is associated with the bandwidth of the first signal that is greater than or equal to 1 resource block (RB), or a duration of 5.55 µs of one of the at least one first symbol is associated with the bandwidth of the first signal that is greater than or equal to 2 RBs.

7. The method according to claim 6, wherein the duration(s) of the at least one first symbol that is/are associated with the bandwidth of the first signal is predefined; or the duration(s) of the at least one first symbol that is associated with the bandwidth of the first signal is/are configured by the first network device by using configuration information carried in radio resource control (RRC) signaling or media access control (MAC) signaling.

8. The method according to claim 6, further comprising:

sending, by the first network device, a second signal to the terminal device, wherein the second signal indicates the bandwidth of the first signal and/or one of the duration(s) of the at least one first symbol that is associated with the bandwidth of the first signal.

9. The method according to claim 8, wherein the second signal further indicates a first field, and the first field comprises one or more of: a coding multiple of a line code of the first signal, a channel coding code rate of the first signal, or a quantity of bit repetitions of the first signal.

10. The method according to claim 6, wherein a duration of 66.7 µs of one of the at least one first symbol is associated with the bandwidth of the first signal that is greater than or equal to 1 RB.

11. An apparatus, comprising:

at least one processor; and a memory coupled to the at least one processor and having program instructions stored thereon which, when executed by the at least one processor, cause the apparatus to:

receive, based on a bandwidth of a first signal, the first signal sent by a first network device, wherein the first signal comprises N first symbols, a modulation scheme of each of the N first symbols is amplitude shift keying (ASK) modulation or on-off keying (OOK) modulation, N is a positive integer, and the first signal is an orthogonal frequency division multiplexing (OFDM) signal;

determine a duration of each of the N first symbols, wherein the duration of the first symbol is one of duration(s) of at least one first symbol that is associated with the bandwidth of the first signal, wherein a duration of 33.3 µs of one of the at least one first symbol is associated with the bandwidth of the first signal that is greater than or equal to 1 RB or a duration of 5.55 µs of one of the at least one first symbol is associated with the bandwidth of the first signal that is greater than or equal to 2 RBs; and determine, based on the duration of the first symbol, an information bit carried in the N first symbols.

12. The apparatus according to claim 11, wherein the duration(s) of the at least one first symbol that is associated with the bandwidth of the first signal is/are predefined; or the duration(s) of the at least one first symbol that is associated with the bandwidth of the first signal is/are configured by the first network device by using configuration information carried in radio resource control (RRC) signaling or media access control (MAC) signaling.

13. The apparatus according to claim 11, wherein the program instructions, when executed by the at least one processor, further cause the apparatus to:

receive a second signal, wherein the second signal indicates the bandwidth of the first signal and/or one of the duration(s) of the at least one first symbol that is associated with the bandwidth of the first signal.

14. The apparatus according to claim 13, wherein the second signal further indicates a first field, and the first field comprises one or more of: a coding multiple of a line code of the first signal, a channel coding code rate of the first signal, or a quantity of bit repetitions of the first signal; and the program instructions, when executed by the at least one processor, further cause the apparatus to:

determine, based on the duration of the first symbol and the first field, the information bit carried in the N first symbols.

15. The apparatus according to claim 11, wherein a duration of 66.7 μs of one of the at least one first symbol is associated with the bandwidth of the first signal that is greater than or equal to 1 RB.

16. An apparatus, comprising:

at least one processor; and a memory coupled to the at least one processor and storing instructions that, when executed by the at least one processor, cause the apparatus to:

send a first signal to a terminal device, wherein the first signal comprises N first symbols, a modulation scheme of each of the N first symbols is amplitude shift keying (ASK) modulation or on-off keying (OOK) modulation, N is a positive integer, the first signal is an orthogonal frequency division multiplexing (OFDM) signal, and a duration of each of the N first symbols is one of duration(s) of at least one first symbol that is associated with a bandwidth of the first signal, wherein a duration of 33.3 μs of one of the at least one first symbol is associated with the bandwidth of the first signal that is greater than or equal to 1 resource block (RB), or a duration of 5.55 μs of one of the at least one first symbol is associated with the bandwidth of the first signal that is greater than or equal to 2 RBs.

17. The apparatus according to claim 16, wherein the duration(s) of the at least one first symbol that is associated with the bandwidth of the first signal is/are predefined; or the duration(s) of the at least one first symbol that is associated with the bandwidth of the first signal is/are configured by the apparatus by using configuration information carried in radio resource control (RRC) signaling or media access control (MAC) signaling.

18. The apparatus according to claim 16, wherein the instructions, when executed by the at least one processor, further cause the apparatus to:

send a second signal to the terminal device, wherein the second signal indicates the bandwidth of the first signal and/or one of the duration(s) of the at least one first symbol that is associated with the bandwidth of the first signal.

19. The apparatus according to claim 18, wherein the second signal further indicates a first field, and the first field comprises one or more of: a coding multiple of a line code of the first signal, a channel coding code rate of the first signal, or a quantity of bit repetitions of the first signal.

20. The apparatus according to claim 16, wherein a duration of 66.7 μs of one of the at least one first symbol is associated with the bandwidth of the first signal that is greater than or equal to 1 RB.

* * * * *